(12) United States Patent
He et al.

(10) Patent No.: US 12,039,154 B2
(45) Date of Patent: Jul. 16, 2024

(54) APPLICATION INTERFACE DISPLAY METHOD AND ELECTRONIC DEVICE

(71) Applicant: Huawei Technologies Co., Ltd., Shenzhen (CN)

(72) Inventors: Shujie He, Wuhan (CN); Puliang Luo, Wuhan (CN); Qianqiao Hu, Wuhan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/043,249

(22) PCT Filed: Aug. 9, 2021

(86) PCT No.: PCT/CN2021/111624
§ 371 (c)(1),
(2) Date: Feb. 27, 2023

(87) PCT Pub. No.: WO2022/042285
PCT Pub. Date: Mar. 3, 2022

(65) Prior Publication Data
US 2023/0315269 A1   Oct. 5, 2023

(30) Foreign Application Priority Data
Aug. 31, 2020   (CN) .......................... 202010899520.6

(51) Int. Cl.
*G06F 17/00*   (2019.01)
*G06F 3/0481*   (2022.01)
(Continued)

(52) U.S. Cl.
CPC ........ *G06F 3/04845* (2013.01); *G06F 3/0481* (2013.01); *G06F 9/44505* (2013.01);
(Continued)

(58) Field of Classification Search
CPC .. G06F 3/04845; G06F 3/0481; G06F 3/0488; G06F 2203/04803;
(Continued)

(56) References Cited

U.S. PATENT DOCUMENTS 9,250,780 B2 *   2/2016   Wang .................. G06F 3/04883
9,342,863 B2 *   5/2016   Freiling ................. G09G 5/373
(Continued)

FOREIGN PATENT DOCUMENTS

CN   103870194 A   6/2014
CN   104572058 A * 4/2015 ........... G06F 3/0481
(Continued)

OTHER PUBLICATIONS

Buhe Aosier, et al, "Scaling Transformation of Remote Sensing Digital Image with Multiple Resolutions from Different Sensors," Acta Geographica Sinica, 2004, vol. 59, Issue 1, 10 pages.

*Primary Examiner* — Laurie A Ries
(74) *Attorney, Agent, or Firm* — Conley Rose, P.C.

(57) ABSTRACT

An application interface display method includes, when an electronic device detects a first user operation of scaling an application interface, a system display pixel density is generated corresponding to the first user operation, where the system display pixel density is not a system display pixel density set by a current system. A change of a system configuration triggers an update of an application setting. After the system display pixel density dispatched by the first user operation is obtained, a first application loads a corresponding application resource and displays an upscale or downscale application interface.

20 Claims, 23 Drawing Sheets

(51) Int. Cl.
*G06F 3/04845* (2022.01)
*G06F 9/445* (2018.01)
*G06F 9/451* (2018.01)
*G06F 3/0488* (2022.01)

(52) U.S. Cl.
CPC ............ *G06F 9/451* (2018.02); *G06F 3/0488* (2013.01); *G06F 2203/04803* (2013.01); *G06F 2203/04806* (2013.01)

(58) Field of Classification Search
CPC .......... G06F 2203/04806; G06F 9/451; G06F 9/44505; G06F 3/04883; G06F 9/44; G06F 2203/04808
See application file for complete search history.

(56) References Cited

U.S. PATENT DOCUMENTS

| | | | |
|---|---|---|---|
| 2003/0044088 A1* | 3/2003 | Wright | G06T 3/4007 |
| | | | 382/300 |
| 2010/0281400 A1 | 11/2010 | Forutanpour et al. | |
| 2011/0163966 A1* | 7/2011 | Chaudhri | G06F 9/451 |
| | | | 345/173 |
| 2014/0365935 A1* | 12/2014 | Moha | G06F 3/04842 |
| | | | 715/769 |
| 2016/0349970 A1* | 12/2016 | Everitt | G06F 3/04883 |
| 2017/0115858 A1* | 4/2017 | Lei | G09G 5/38 |
| 2019/0065035 A1* | 2/2019 | Lee | G06F 3/04845 |
| 2019/0379893 A1* | 12/2019 | Krishnan | H04N 19/172 |
| 2019/0384485 A1* | 12/2019 | Faulkner | H04N 7/147 |
| 2020/0034026 A1* | 1/2020 | Han | G06F 3/0488 |
| 2020/0264827 A1* | 8/2020 | Choi | G06F 3/04845 |
| 2022/0365661 A1* | 11/2022 | Dong | G06F 3/016 |

FOREIGN PATENT DOCUMENTS

| | | | | | |
|---|---|---|---|---|---|
| CN | 105892823 A | * | 8/2016 | .......... | G06F 3/0481 |
| CN | 113597595 A | * | 11/2021 | .......... | G06F 1/1616 |
| CN | 108519962 B | * | 4/2022 | .......... | G06F 40/109 |

* cited by examiner

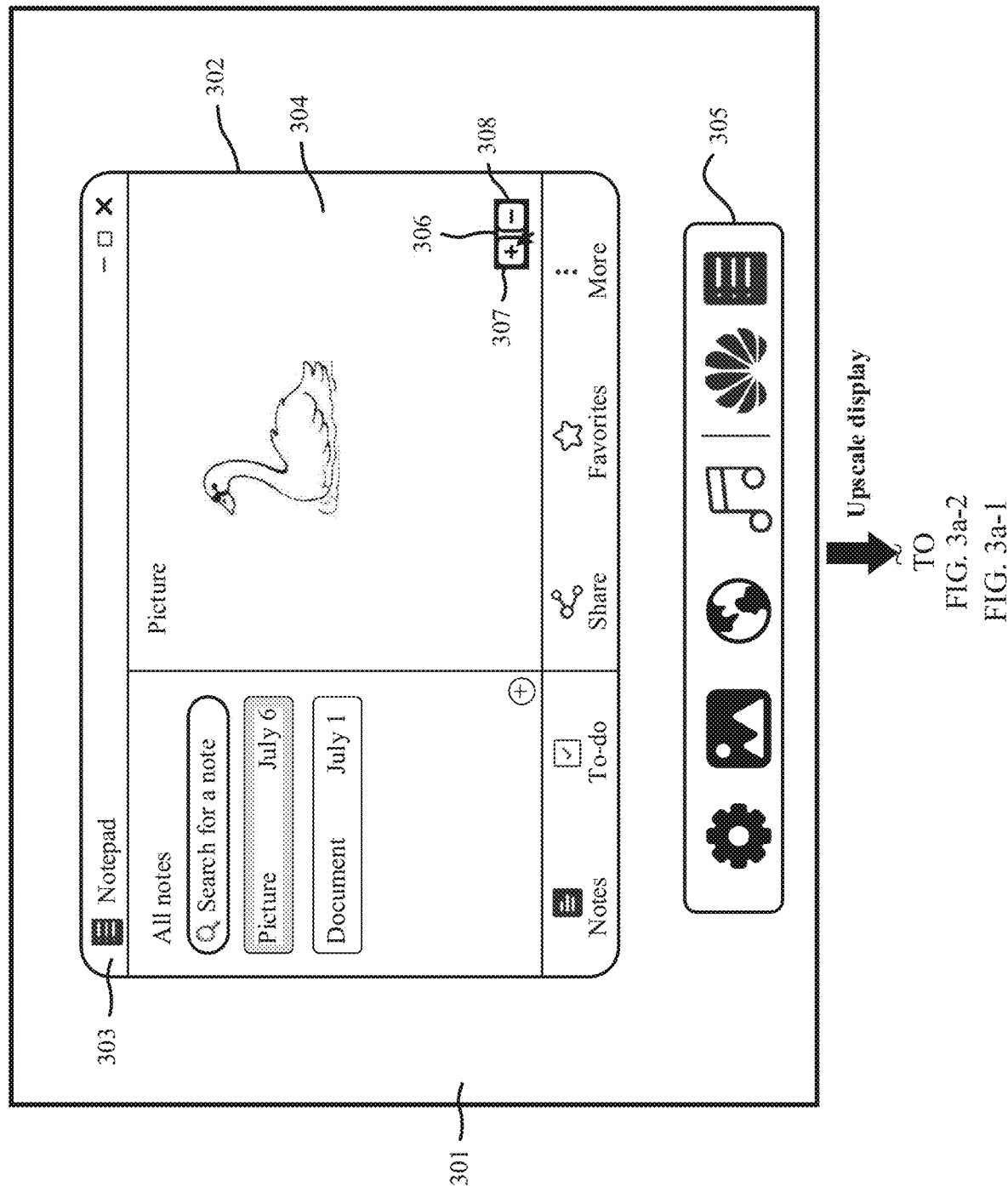

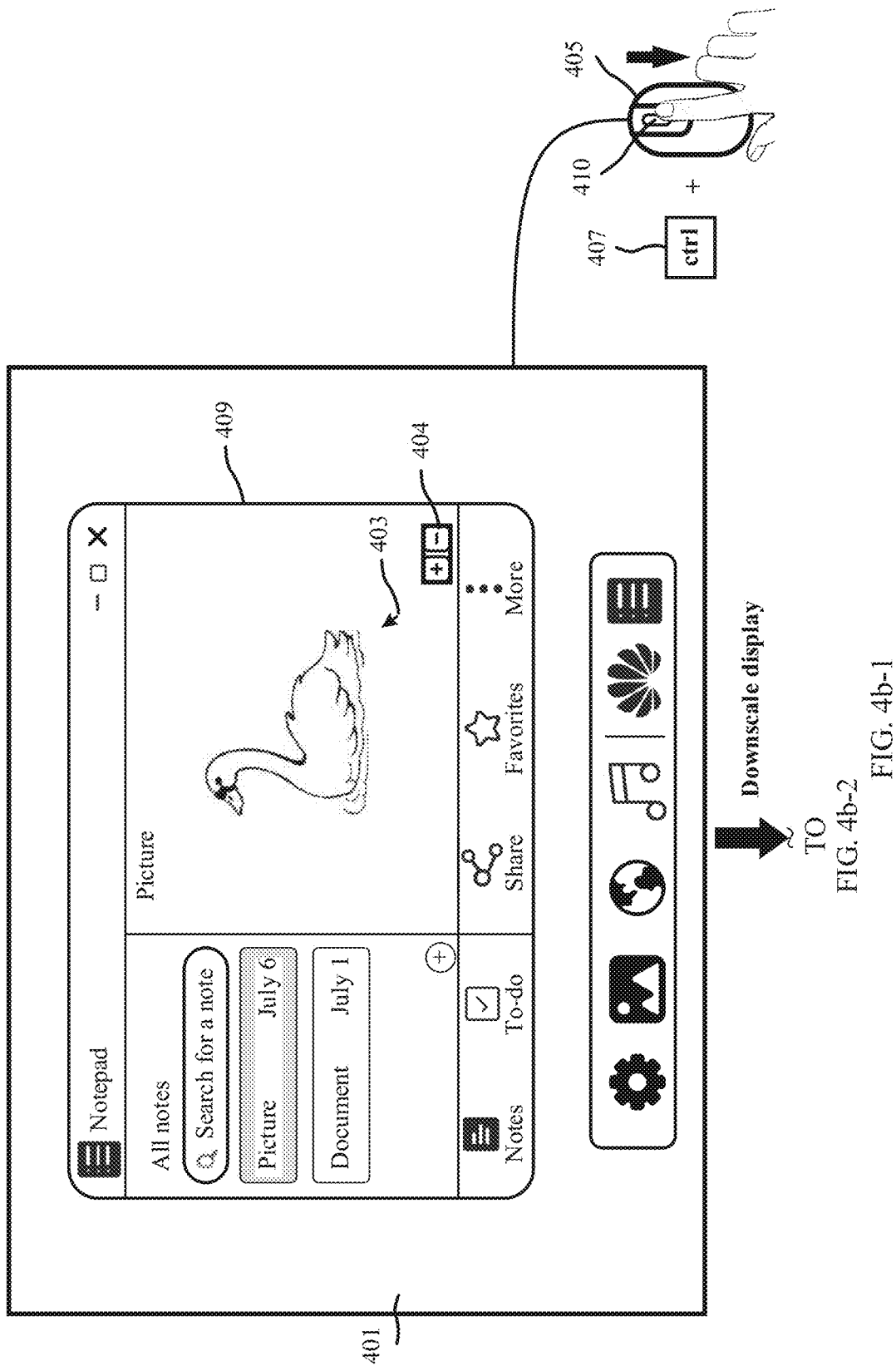

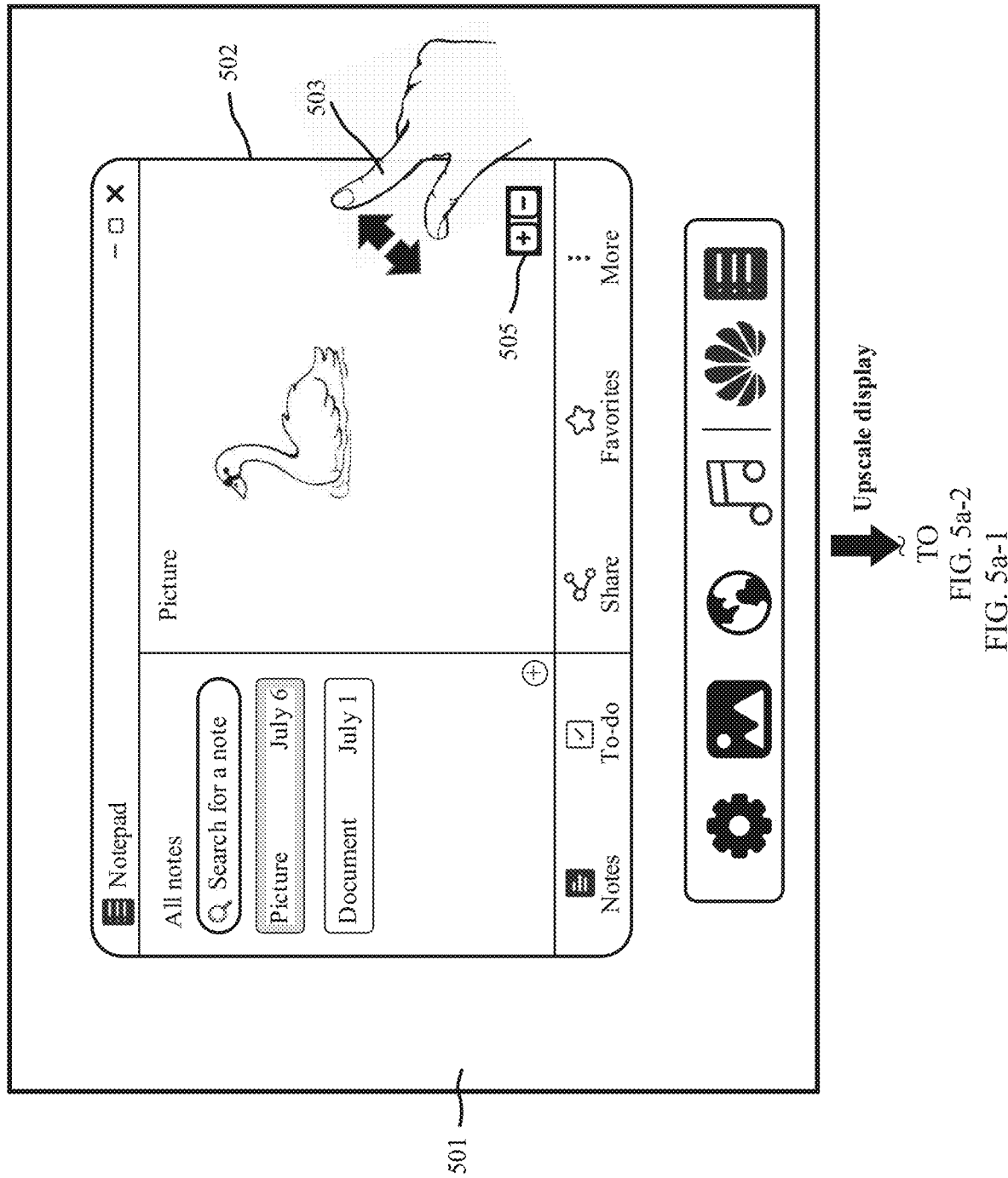

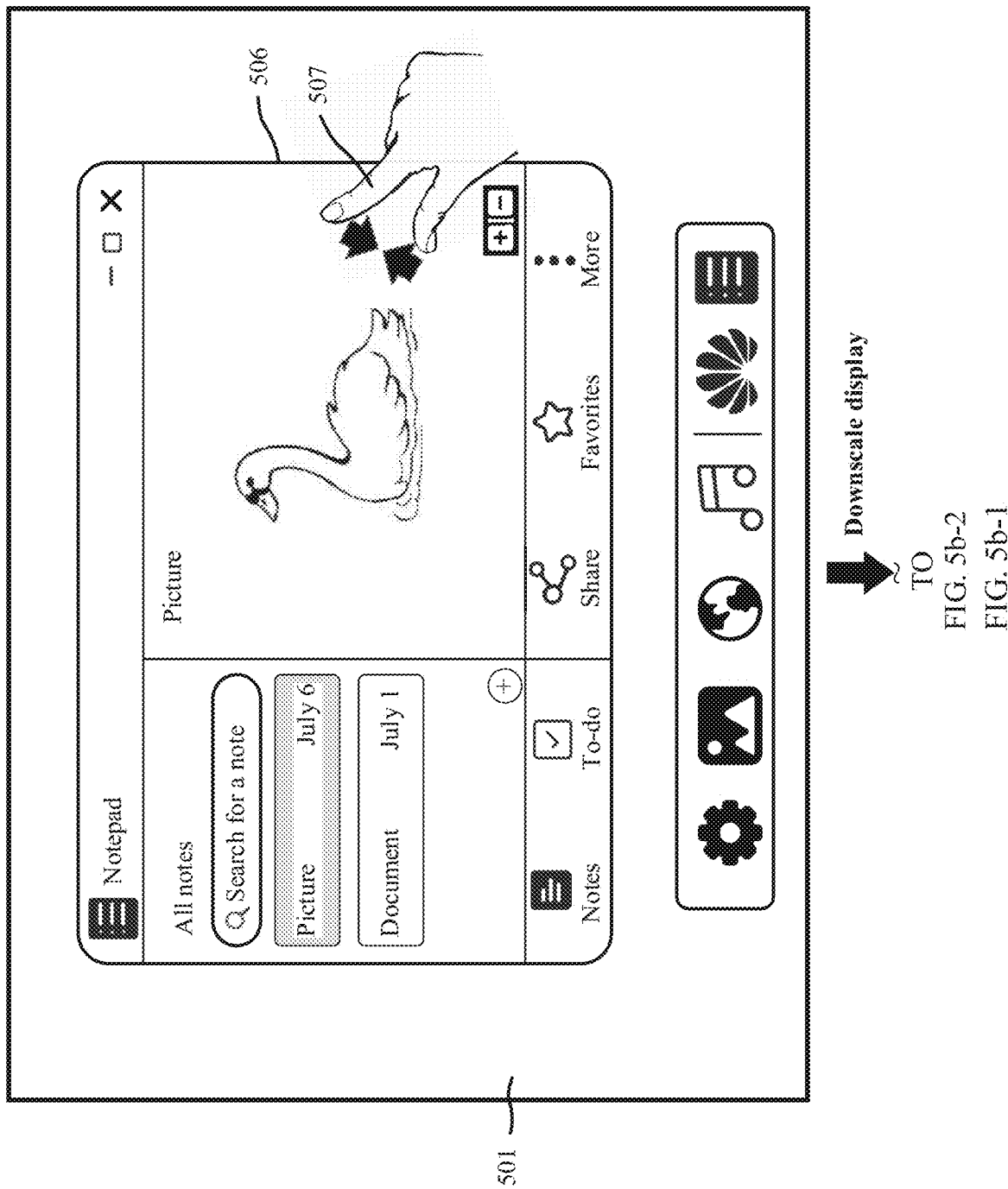

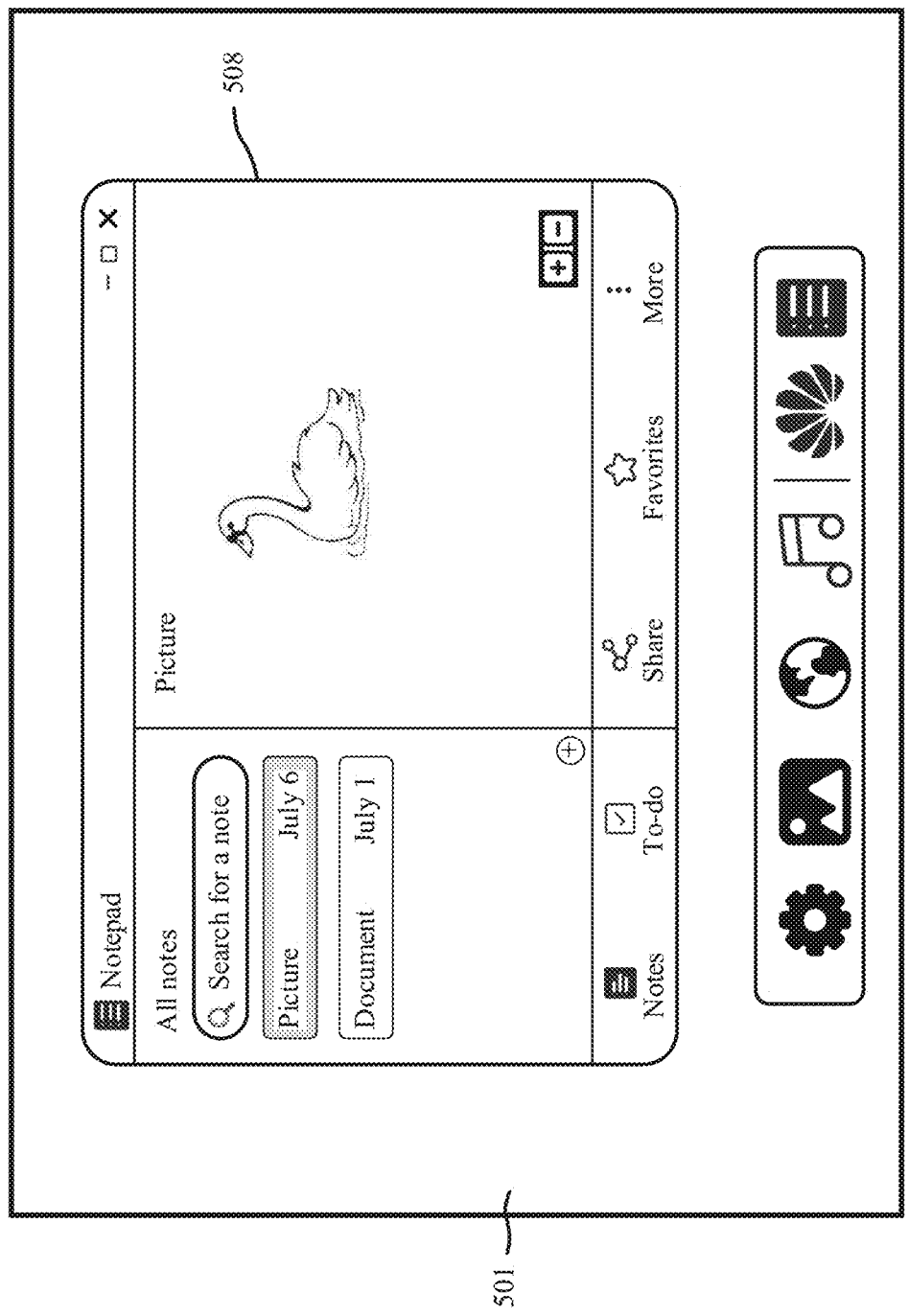

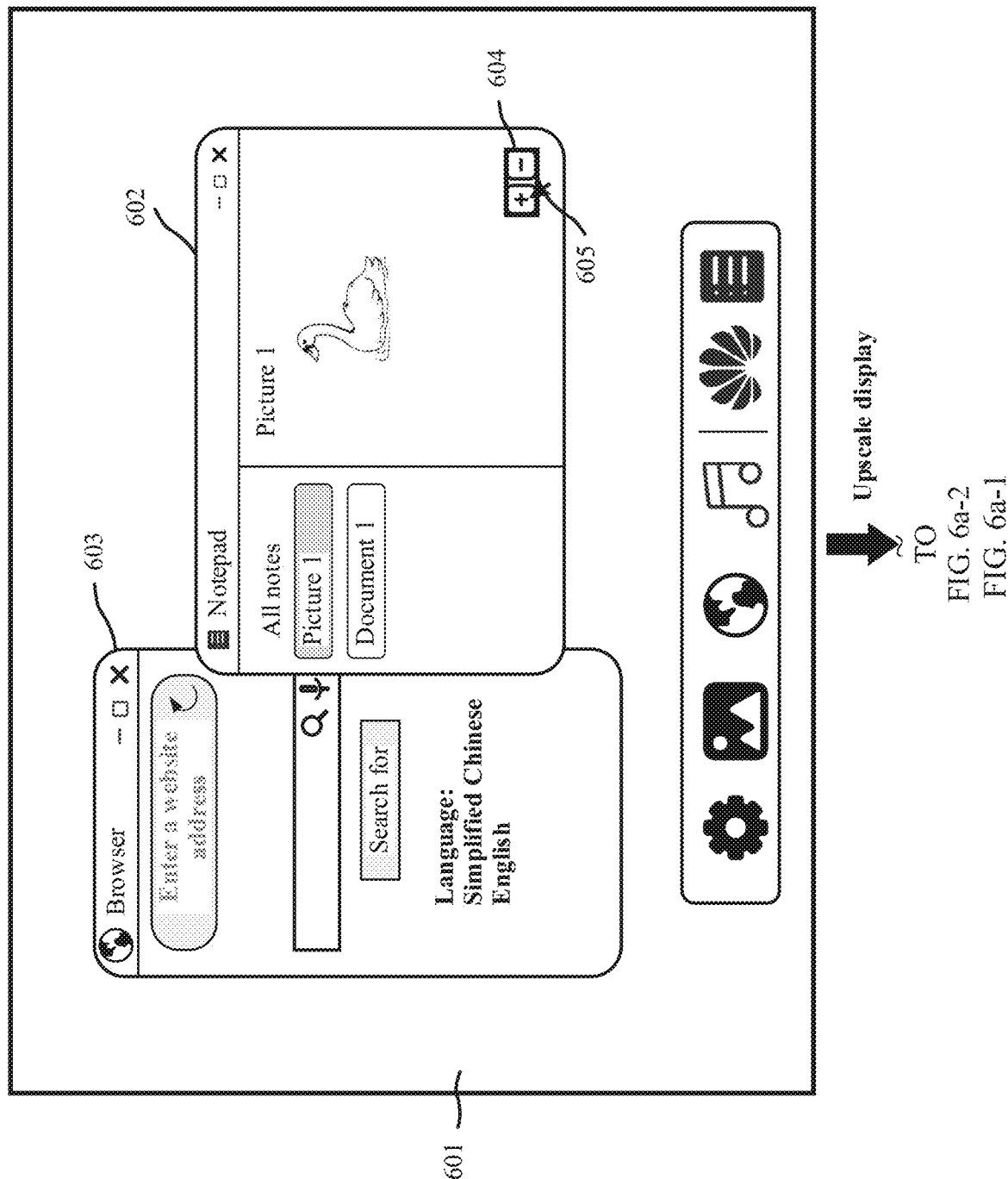

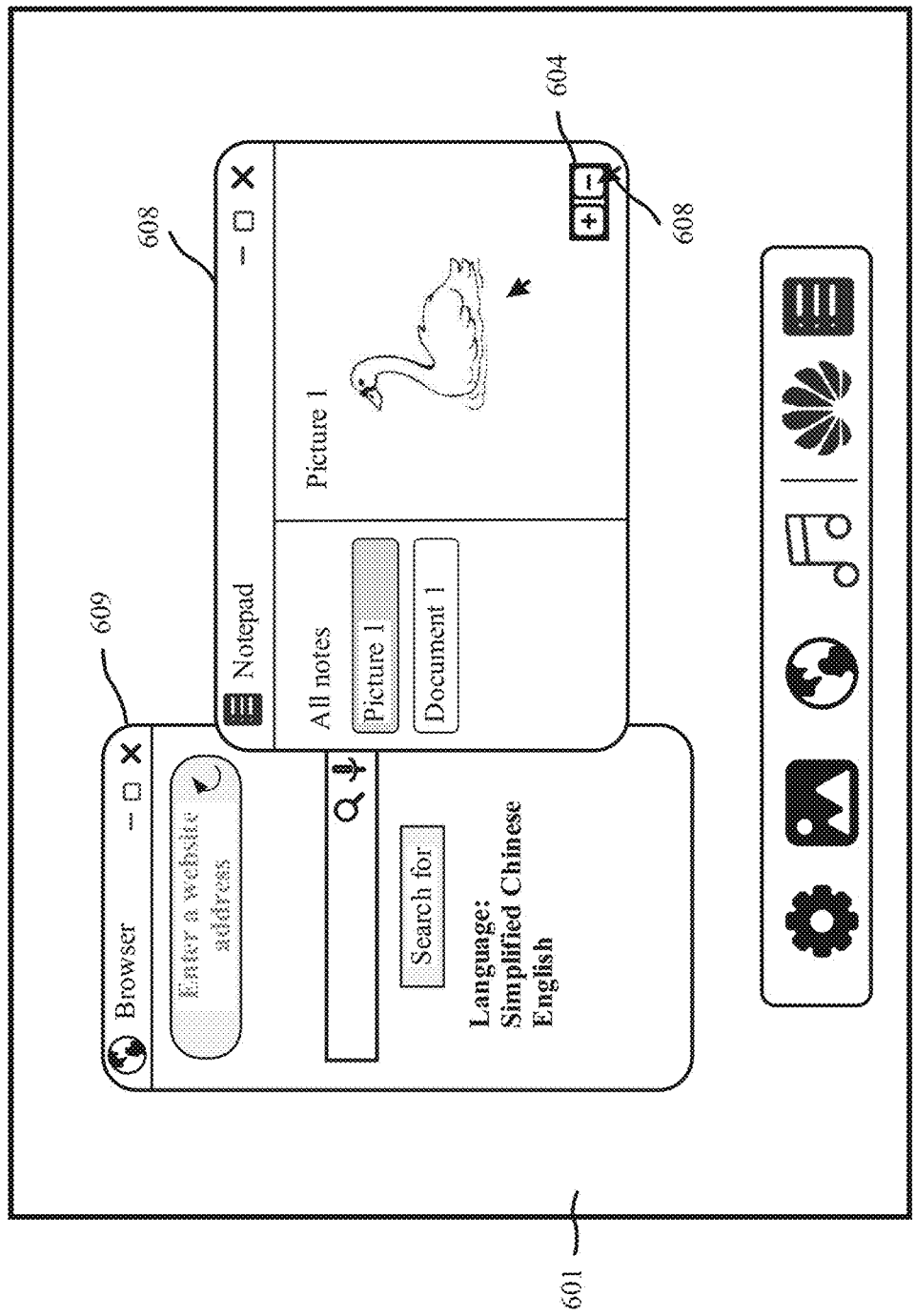

APPLICATION INTERFACE DISPLAY METHOD AND ELECTRONIC DEVICE

This is a U.S. National Stage of International Patent Application No. PCT/CN2021/111624 filed on Aug. 9, 2021, which claims priority to Chinese Patent Application No. 202010899520.6 filed on Aug. 31, 2020, both of which are hereby incorporated by reference in their entireties.

TECHNICAL FIELD

This application relates to the terminal field, and in particular, to an application interface display method and an electronic device.

BACKGROUND

In a personal computer (personal computer, PC) equipped with an Android® system, an application interface is adaptively displayed based on a display pixel density set in the system. Generally, when a system display pixel density is specific, an application supports only one type of adaptive display. As a result, displayed content in an application interface may be excessively large or excessively small, which does not meet a reading requirement of a user. If a display interface of the application is forcibly upscaled, size scaling and location adjustment may be performed on each element in the application, contents in the display interface of the application are increased or decreased, and problems such as picture distortion, control deformation, and blurred font display may occur in the display interface of the application. Consequently, visual experience of a user is poor.

SUMMARY

This application provides an interface display method, an electronic device, and a computer storage medium, to resolve a scaling display problem in an application interface.

The foregoing and other objectives are achieved by using features in the independent claims. Further implementations are embodied in the dependent claims, the specification, and the accompanying drawings.

According to a first aspect, an embodiment of this application provides an interface display method, and the method may include:

An electronic device may display a first window of a first application and a second window of a second application, where interface elements displayed in the first window and the second window use a first pixel density. The electronic device detects a first input operation, where the first input operation is used to determine a second pixel density, and the second pixel density is different from the first pixel density. The electronic device displays a third window of the first application and the second window of the second application, where an interface element displayed in the third window uses the second pixel density, and the interface element displayed in the second window uses the first pixel density.

Through implementation of the method in the first aspect, a user interface of an application can implement quick scaling display. This meets a requirement of a user for upscaling or downscaling displayed content in an application interface, provides the user with a friendly operating environment, improves visual experience of the user, facilitates a developer, and reduces development resources of an application.

With reference to the first aspect, in some embodiments, the method further includes: Before displaying the third window, the electronic device notifies the first application of the second pixel density.

With reference to the first aspect, in some embodiments, the electronic device may include a scale control, and the scale control may include an upscale control and a downscale control.

With reference to the first aspect, in some embodiments, if the first input operation is an operation applied to the upscale control, the second pixel density is less than the first pixel density.

With reference to the first aspect, in some embodiments, if the first input operation is an operation applied to the upscale control, a size of the interface element displayed in the third window is larger than a size of the interface element displayed in the first window.

With reference to the first aspect, in some embodiments, if the first input operation is an operation applied to the downscale control, the second pixel density is greater than the first pixel density.

With reference to the first aspect, in some embodiments, if the first input operation is an operation applied to the downscale control, a size of the interface element displayed in the third window is smaller than a size of the interface element displayed in the first window.

With reference to the first aspect, in some embodiments, the method further includes: After obtaining the second pixel density, the first application may refresh an application configuration and load a second application resource based on the second pixel density, where the second application resource is a resource file configured for the second pixel density, a first application resource is a resource file configured for the first pixel density, and the second application resource is different from the first application resource.

With reference to the first aspect, in some embodiments, a pixel density dpi that can be used by the first application is one of the following: 120 dpi, 160 dpi, 240 dpi, 320 dpi, 480 dpi, and 640 dpi.

With reference to the first aspect, in some embodiments, if the first application includes a plurality of sets of application resources, the first application is in a first list; or if the first application has only a single set of application resources, the first application is in a second list.

With reference to the first aspect, in some embodiments, the method further includes: The electronic device responds to the first input operation if the first application is in the first list or if the first application is not in the second list.

With reference to the first aspect, in some embodiments, the first input operation may be any one or more of the following upscale operations: simultaneously pressing a first key on a keyboard and sliding a scroll wheel of a mouse upward, simultaneously pressing a second key and a third key on the keyboard, clicking an upscale control of a scale control, or opening two fingers to slide on a touchscreen or a touch panel in opposite directions to reach a first distance and a first gesture operation.

With reference to the first aspect, in some embodiments, the scale control is a floating control.

With reference to the first aspect, in some embodiments, the scale control is located in the first window.

With reference to the first aspect, in some embodiments, the first input operation may be any one or more of the following downscale operations: simultaneously pressing a first key on a keyboard and sliding a scroll wheel of a mouse downward, simultaneously pressing a second key and a fourth key on the keyboard, clicking a downscale control of a scale control, or gathering two fingers to slide on a touchscreen or a touch panel in opposite directions to reach a second distance and a second gesture operation.

According to a second aspect, an embodiment of this application provides another interface display method, and the method may include:

An electronic device displays a first user interface, where the first user interface includes a first region and a second region, an interface element displayed in the first region is from an operating system of the electronic device, an interface element displayed in the second region is from a first application, and display pixel densities of the first region and the second region each are a first system display pixel density. The electronic device detects a first input operation, where the first input operation is used to determine a second system display pixel density. The electronic device displays a second user interface, where the second user interface includes a first region and a second region, a display pixel density of the first region is the first system display pixel density, and a display pixel density of the second region is the second system display pixel density.

Through implementation of the method in the second aspect, a user interface of an application can implement quick scaling display. This meets a requirement of a user for upscaling or downscaling displayed content in an application interface, provides the user with a friendly operating environment, improves visual experience of the user, facilitates a developer, and reduces development resources of an application.

With reference to the second aspect, in some embodiments, the method further includes: Before displaying the second user interface, the electronic device notifies the first application of the second display pixel density.

With reference to the second aspect, in some embodiments, the electronic device may include a scale control, and the scale control may include an upscale control and a downscale control.

With reference to the second aspect, in some embodiments, the first input operation may be an upscale operation or a downscale operation.

With reference to the second aspect, in some embodiments, if the first input operation is the upscale operation, the second display pixel density is less than the first display pixel density.

With reference to the second aspect, in some embodiments, if the first input operation is the downscale operation, the second display pixel density is greater than the first display pixel density.

With reference to the second aspect, in some embodiments, the method further includes: After obtaining the second display pixel density, the first application may refresh an application configuration and load a second application resource based on the second display pixel density, where the second application resource is a resource file configured for the second display pixel density, a first application resource is a resource file configured for the first display pixel density, and the second application resource is different from the first application resource.

With reference to the second aspect, in some embodiments, a pixel density dpi that can be used by the first application is one of the following: 120 dpi, 160 dpi, 240 dpi, 320 dpi, 480 dpi, and 640 dpi.

With reference to the second aspect, in some embodiments, if the first application includes a plurality of sets of application resources, the first application is in a first list; or if the first application has only a single set of application resources, the first application is in a second list.

With reference to the second aspect, in some embodiments, the method further includes: The electronic device responds to the first input operation if the first application is in the first list or if the first application is not in the second list.

With reference to the second aspect, in some embodiments, the upscale operation may be any one or more of the following: simultaneously pressing a first key on a keyboard and sliding a scroll wheel of a mouse upward, simultaneously pressing a second key and a third key on the keyboard, clicking an upscale control of a scale control, or opening two fingers to slide on a touchscreen or a touch panel in opposite directions to reach a first distance and a first gesture operation.

With reference to the second aspect, in some embodiments, the downscale operation may be any one or more of the following: simultaneously pressing a first key on a keyboard and sliding a scroll wheel of a mouse downward, simultaneously pressing a second key and a fourth key on the keyboard, clicking a downscale control of a scale control, or gathering two fingers to slide on a touchscreen or a touch panel in opposite directions to reach a second distance and a second gesture operation.

According to a third aspect, an embodiment of the present invention provides an electronic device, and the electronic device includes a memory and a processor coupled to the memory. The memory stores computer-executable instructions, and the processor is configured to invoke the instructions, so that the electronic device performs any of the functions of the electronic device according to the first aspect and the second aspect. Details are not described herein.

According to a fourth aspect, an embodiment of the present invention provides a computer storage medium, and the storage medium stores a computer program. The computer program includes executable instructions, and when the executable instructions are executed by a processor, the processor is enabled to perform operations corresponding to the methods provided in the first aspect and the second aspect.

Through implementation of the technical solutions in this application, a user interface of an application can implement quick scaling display. This meets a requirement of a user for upscaling or downscaling displayed content in an application interface, provides the user with a friendly operating environment, improves visual experience of the user, facilitates a developer, and reduces development resources of an application.

BRIEF DESCRIPTION OF DRAWINGS

To describe technical solutions in embodiments of this application or in the background more clearly, the following describes the accompanying drawings used in embodiments of this application or in the background.

FIG. 3a-1 and FIG. 3a-2 are a schematic diagram of a user interface according to an embodiment of this application;

FIG. 3b-1 and FIG. 3b-2 are a schematic diagram of a user interface according to an embodiment of this application;

FIG. 4a-1 and FIG. 4a-2 are a schematic diagram of a user interface according to an embodiment of this application;

FIG. 4b-1 and FIG. 4b-2 are a schematic diagram of a user interface according to an embodiment of this application;

FIG. 5a-1 and FIG. 5a-2 are a schematic diagram of a user interface according to an embodiment of this application;

FIG. 5b-1 and FIG. 5b-2 are a schematic diagram of a user interface according to an embodiment of this application;

FIG. 6a-1 and FIG. 6a-2 are a schematic diagram of a user interface according to an embodiment of this application;

FIG. 6b-1 and FIG. 6b-2 are a schematic diagram of a user interface according to an embodiment of this application;

DESCRIPTION OF EMBODIMENTS

Figure 1:
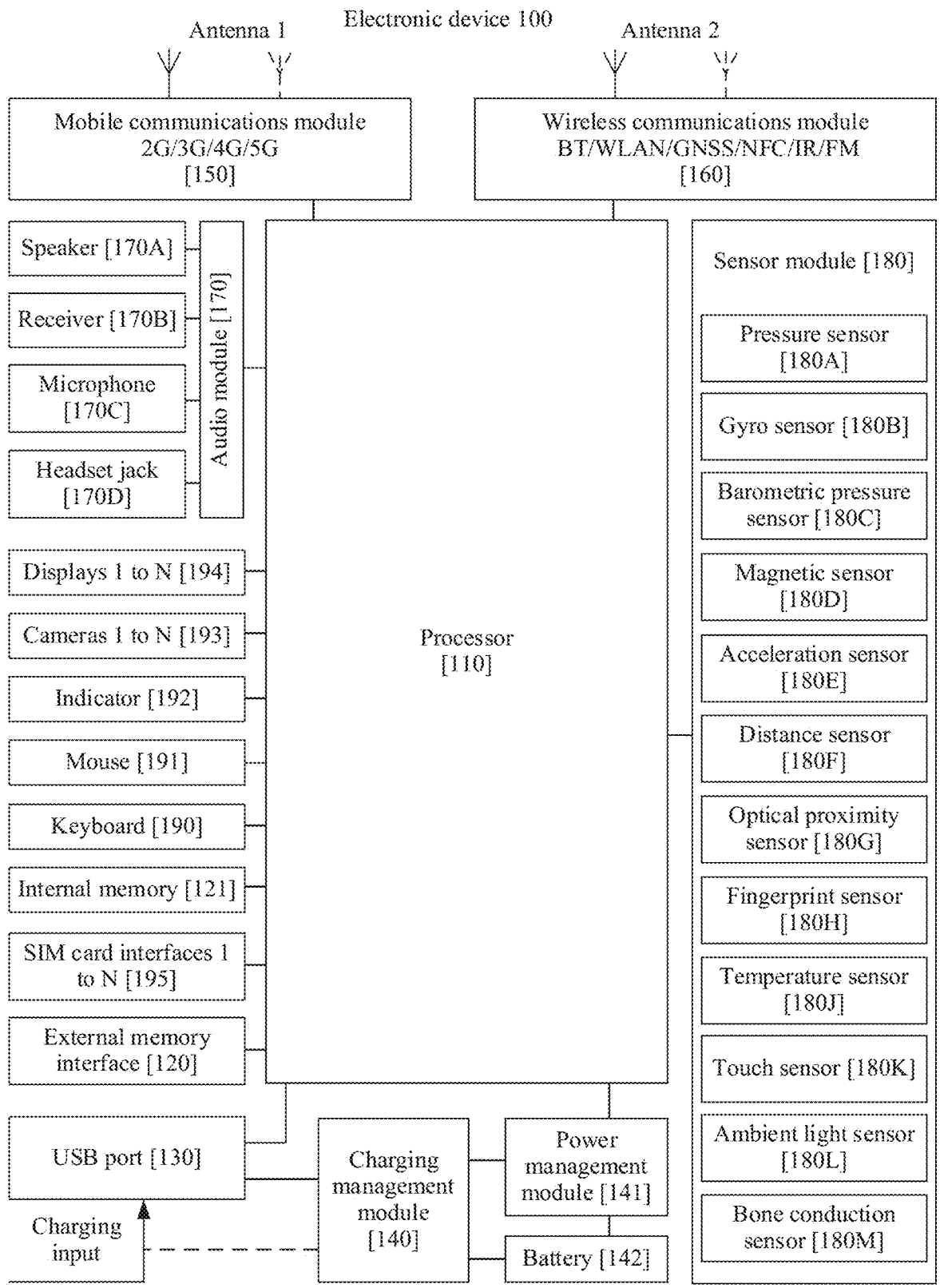
FIG. 1 is a schematic diagram of a hardware structure of an electronic device according to an embodiment of this application.

The following describes embodiments of this application in detail with reference to the accompanying drawings. Terms used in the following embodiments of this application are merely intended to describe particular embodiments, but are not intended to limit this application. The terms "one", "a" and "this" of singular forms used in this specification and the appended claims of this application are also intended to include plural forms, unless otherwise specified in the context clearly. It should be further understood that the term "and/or" used in this application means and includes any or all possible combinations of one or more listed items.

This application provides an electronic device. The electronic device may be a notebook computer, a desktop computer, a tablet computer, a smartphone, and another type of electronic device. This application further provides an application interface display method. The method can be applied to the electronic device provided in this application. When the electronic device detects a first user operation of scaling an application interface, the first user operation correspondingly generates a system display pixel density. The system display pixel density is not a system display pixel density actually set in a current system. A change in a system configuration triggers an update of settings of an application. After obtaining a virtual system display pixel density correspondingly delivered by the first user operation, a first application loads a corresponding application resource and displays an upscaled or downscaled application interface. The first user operation may be clicking a scale control, such as an upscale (+) control or a downscale (−) control, in a user interface of the first application; may be simultaneously pressing a "ctrl" key and sliding a scroll wheel of a mouse upward/downward, simultaneously pressing the "ctrl" key and a "▲"/"▼" key, and so on when a mouse pointer is located in the user interface of the first application; or may be a touch event, for example, in the user interface of the first application on a touchscreen, two fingers of a user gather/open the touchscreen in opposite directions; or may be a gesture operation event, such as a special gesture for mid-air recognition. Through implementation of the technical solutions in this application, a user interface of an application can implement quick scaling display. This meets a requirement of a user for upscaling or downscaling displayed content in an application interface, provides the user with a friendly operating environment, improves visual experience of the user, facilitates a developer, and reduces development resources of an application.

An example electronic device 100 provided in the embodiments of this application is first described. It should be understood that the electronic device 100 may have more or fewer components than shown in the figures, may combine two or more components, or may have different component configurations. Various components shown in the figure may be implemented in hardware, software, or a combination of hardware and software including one or more signal processing and/or application-specific integrated circuits.

FIG. 1 is a schematic diagram of a structure of the electronic device 100.

The electronic device 100 may include a processor 110, an external memory interface 120, an internal memory 121, a universal serial bus (universal serial bus, USB) port 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identity module (subscriber identity module, SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of the present invention does not constitute a specific limitation on the electronic device 100. In some other embodiments of this application, the electronic device 100 may include more or fewer components than those shown in the figure, combine some components, split some components, or have different component arrangements. The components shown in the figure may be implemented by using hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be independent devices, or may be integrated into one or more processors.

The controller may be a nerve center and a command center of the electronic device 100. The controller may generate an operation control signal based on an instruction operation code and a time sequence signal, to complete control of instruction fetching and instruction execution.

A memory may be disposed in the processor 110, and is configured to store instructions and data. In some embodiments, the memory in the processor 110 is a cache. The memory may store instructions or data that has been used or is cyclically used by the processor 110. If the processor 110 needs to use the instructions or the data again, the processor may directly invoke the instructions or the data from the memory. This avoids repeated access, reduces waiting time of the processor 110, and improves system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) port, and/or the like.

The I2C interface is a two-way synchronization serial bus, and includes one serial data line (serial data line, SDA) and one serial clock line (serial clock line, SCL). In some embodiments, the processor 110 may include a plurality of groups of I2C buses. The processor 110 may be separately coupled to the touch sensor 180K, a charger, a flashlight, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the electronic device 100.

The I2S interface may be used for audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the wireless communications module 160 through the I2S interface, to implement a function of answering a call by using a Bluetooth headset.

The PCM interface may also be used for audio communication, and analog signal sampling, quantization, and coding. In some embodiments, the audio module 170 may be coupled to the wireless communications module 160 through a PCM bus interface. In some embodiments, the audio module 170 may alternatively transmit an audio signal to the wireless communications module 160 through the PCM interface, to implement a function of answering a call through a Bluetooth headset. Both the I2S interface and the PCM interface may be used for audio communication.

The UART interface is a universal serial data bus, and is used for asynchronous communication. The bus may be a two-way communications bus. The bus converts to-be-transmitted data between serial communication and parallel communication. In some embodiments, the UART interface is usually used to connect the processor 110 to the wireless communications module 160. For example, the processor 110 communicates with a Bluetooth module in the wireless communications module 160 through the UART interface, to implement a Bluetooth function. In some embodiments, the audio module 170 may transmit an audio signal to the wireless communications module 160 through the UART interface, to implement a function of playing music by using a Bluetooth headset.

The MIPI interface may be configured to connect the processor 110 to a peripheral component such as the display screen 194 or the camera 193. The MIPI interface includes a camera serial interface (camera serial interface, CSI), a display serial interface (display serial interface, DSI), and the like. In some embodiments, the processor 110 communicates with the camera 193 through the CSI, to implement a photographing function of the electronic device 100. The processor 110 communicates with the display screen 194 through the DSI, to implement a display function of the electronic device 100.

The GPIO interface may be configured by using software. The GPIO interface may be configured as a control signal, or may be configured as a data signal. In some embodiments, the GPIO interface may be configured to connect the processor 110 to the camera 193 the display screen 194, the wireless communications module 160, the audio module 170, the sensor module 180, or the like. The GPIO interface may be configured as the I2C interface, the I2S interface, the UART interface, the MIPI interface, or the like.

A SIM interface may be used to communicate with the SIM card interface 195 to implement a function of transferring data to a SIM card or reading data from the SIM card.

The USB port 130 is a port that conforms to a USB standard specification, and may be specifically a mini USB port, a micro USB port, a USB Type-C port, or the like. The USB port 130 may be configured to connect to a charger to charge the electronic device 100, or may be configured to transmit data between the electronic device 100 and a peripheral device, or may be configured to connect to a headset, to play audio by using the headset. The port may be configured to connect to another electronic device such as an AR device.

It may be understood that an interface connection relationship between the modules that is shown in this embodiment of the present disclosure is merely an example for description, and does not constitute a limitation on a structure of the electronic device 100. In some other embodiments of this application, the electronic device 100 may alternatively use an interface connection manner different from that in the foregoing embodiment, or use a combination of a plurality of interface connection manners.

The charging management module 140 is configured to receive a charge input from the charger. The charger may be a wireless charger or a wired charger.

The power management module 141 is configured to connect the battery 142, the charging management module 140, and the processor 110. The power management module 141 receives an input of the battery 142 and/or the charging management module 140, and supplies power to the processor 110, the internal memory 121, an external memory, the display screen 194, the camera 193, the wireless communications module 160, and the like.

A wireless communication function of the electronic device 100 may be implemented by using the antenna 1, the antenna 2, the mobile communications module 150, the wireless communications module 160, the modem processor, the baseband processor, and the like.

The antenna 1 and the antenna 2 are configured to transmit and receive an electromagnetic wave signal. Each antenna in the electronic device 100 may be configured to cover one or more communication frequency bands. Different antennas may be multiplexed, to improve antenna utilization. For example, the antenna 1 may be multiplexed as a diversity antenna in a wireless local area network. In some other embodiments, an antenna may be used in combination with a tuning switch.

The mobile communications module 150 may provide a wireless communication solution that is applied to the electronic device 100 and that includes 2G/3G/4G/5G or the like. The mobile communications module 150 may include at least one filter, a switch, a power amplifier, a low noise amplifier (low noise amplifier, LNA), and the like. The mobile communications module 150 may receive an electromagnetic wave through the antenna 1, perform processing such as filtering or amplification on the received electromagnetic wave, and transmit the electromagnetic wave to the modem processor for demodulation. The mobile communications module 150 may further amplify a signal modulated by the modem processor, and convert the signal into an electromagnetic wave for radiation through the antenna 1. In some embodiments, at least some functional modules of the mobile communications module 150 may be disposed in the processor 110. In some embodiments, at least some functional modules of the mobile communications module 150 may be disposed in a same device as at least some modules of the processor 110.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The baseband processor processes the low-frequency baseband signal, and then transfers an obtained signal to the application processor. The application processor outputs a sound signal by using an audio device (which is not limited to the speaker 170A, the receiver 170B, and the like), or displays an image or a video on the display screen 194. In some embodiments, the modem processor may be an independent component. In some other embodiments, the modem processor may be independent of the processor 110, and is disposed in the same device as the mobile communications module 150 or another functional module.

The wireless communications module 160 may provide a wireless communication solution that is applied to the electronic device 100 and that includes a wireless local area network (wireless local area network, WLAN) (for example, a wireless fidelity (wireless fidelity, Wi-Fi) network), Bluetooth (Bluetooth, BT), a global navigation satellite system (global navigation satellite system. GNSS), frequency modulation (frequency modulation, FM), a near field communication (near field communication, NFC) technology, an infrared (infrared, IR) technology, or the like. The wireless communications module 160 may be one or more components integrating at least one communications processor module. The wireless communications module 160 receives an electromagnetic wave through the antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and convert the signal into an electromagnetic wave for radiation through the antenna 2.

In some embodiments, the antenna 1 and the mobile communications module 150 in the electronic device 100 are coupled, and the antenna 2 and the wireless communications module 160 in the electronic device 100 are coupled, so that the electronic device 100 can communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), BeiDou navigation satellite system (BeiDou navigation satellite system, BDS), a quasi-zenith satellite system (quasi-zenith satellite system, QZSS), and/or satellite based augmentation systems (satellite based augmentation systems, SBAS).

The electronic device 100 may implement a display function through the GPU, the display screen 194, the application processor, and the like. The GPU is a microprocessor for image processing, and is connected to the display screen 194 and the application processor. The GPU is configured to: perform mathematical and geometric calculation, and render an image. The processor 110 may include one or more GPUs that execute program instructions to generate or change display information. When an application refreshes an interface, the processor 110 may dynamically arrange elements in the interface of the application based on a preset arrangement rule and a current display state of the display screen 194.

The display screen 194 is configured to display an image, a video, or the like. The display screen 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flexible light-emitting diode, FLED), a mini-LED, a micro-LED, a micro-OLED, a quantum dot light emitting diode (quantum dot light emitting diode, QLED), or the like. In some embodiments, the electronic device 100 may include one or N displays 194, where N is a positive integer greater than 1. A resolution of the display screen 194 may be represented as a total quantity of physical pixels that can be displayed on the display screen, for example, 1920× 1080. A pixel density (pixels per inch, PPI) is usually used to indicate a degree of display fineness of a display screen. Higher PPI indicates a finer interface displayed on the display screen, and richer display details.

The electronic device 100 can implement a photographing function by using the ISP, the camera 193, the video codec, the GPU, the display screen 194, the application processor, and the like.

The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and is projected onto the photosensitive element. The photosensitive element may be a charge coupled device (charge coupled device, CCD) or a complementary metal-oxide-semiconductor (complementary metal-oxide-semiconductor, CMOS) photoelectric transistor. The photosensitive element converts an optical signal into an electrical signal, and then transmits the electrical signal to the ISP for converting the electrical signal into a digital image signal. The ISP outputs the digital image signal to the DSP for processing. The DSP converts the digital image signal into an image signal in a standard format, for example, RGB or YUV. In some embodiments, the electronic device 100 may include one or N 3D camera modules 193, where N is a positive integer greater than 1.

The digital signal processor is configured to process a digital signal, and may process another digital signal in addition to the digital image signal. For example, when the electronic device 100 selects a frequency, the digital signal processor is configured to perform Fourier transform on frequency energy.

The video codec is configured to: compress or decompress a digital video. The electronic device 100 may support one or more types of video codecs. Therefore, the electronic device 100 may play or record videos in a plurality of coding formats, for example, moving picture experts group (moving picture experts group, MPEG)-1, MPEG-2, MPEG-3, and MPEG-4.

The NPU is a neural-network (neural-network, NN) computing processor. The NPU quickly processes input information with reference to a structure of a biological neural network, for example, a transfer mode between human brain neurons, and may further continuously perform self-learning. Applications such as intelligent cognition of the electronic device 100, for example, image recognition, facial recognition, speech recognition, and text understanding, may be implemented through the NPU.

The external memory interface 120 may be used to connect to an external storage card, for example, a micro SD card, to extend a storage capability of the electronic device 100. The external storage card communicates with the processor 110 through the external memory interface 120, to implement a data storage function. For example, files such as music and a video are stored in the external storage card.

The internal memory 121 may be configured to store computer-executable program code. The executable program code includes instructions. The processor 110 implements various function applications and data processing of the electronic device 100 by running the instructions stored in the internal memory 121. The internal memory 121 may include a program storage area and a data storage area. The program storage region may store an operating system, an application required by at least one function (such as a facial recognition function, fingerprint recognition function, and a mobile payment function), and the like. The data storage region may store data (such as facial information template data, a fingerprint information template, and the like) created during use of the electronic device 100, and the like. In addition, the internal memory 121 may include a high-speed random access memory, and may further include a nonvolatile memory, for example, at least one magnetic disk storage device, a flash memory device, or a universal flash storage (universal flash storage, UFS).

The electronic device 100 may implement an audio function, for example, music playing and recording, through the audio module 170, the speaker 170A, the receiver 170B, the microphone 170C, the headset jack 170D, the application processor, and the like.

The audio module 170 is configured to convert digital audio information into an analog audio signal output, and is also configured to convert an analog audio input into a digital audio signal. The audio module 170 may be further configured to: code and decode an audio signal. In some embodiments, the audio module 170 may be disposed in the processor 110, or some functional modules of the audio module 170 are disposed in the processor 110.

The speaker 170A, also referred to as a "loudspeaker", is configured to convert an audio electrical signal into a sound signal. The electronic device 100 may listen to music or answer a hands-free call by using the speaker 170A.

The receiver 170B, also referred to as an "earpiece", is configured to convert an electrical audio signal into a sound signal. When a call is answered or audio information is listened to by using the electronic device 100, the receiver 170B may be put close to a human ear to listen to a voice.

The microphone 170C, also referred to as a "mike" or a "mic", is configured to convert a sound signal into an electrical signal. When making a call or sending speech information, a user may place the mouth of the user near the microphone 170C to make a sound, to input a sound signal to the microphone 170C. At least one microphone 170C may be disposed in the electronic device 100. In some other embodiments, two microphones 170C may be disposed in the electronic device 100, to collect a sound signal and further implement a noise reduction function. In some other embodiments, three, four, or more microphones 170C may alternatively be disposed in the electronic device 100, to collect a sound signal, implement noise reduction, and identify a sound source, to implement a directional recording function and the like.

The headset jack 170D is configured to connect to a wired headset. The headset jack 170D may be the USB port 130, or may be a 3.5 mm open mobile terminal platform (open mobile terminal platform, OMTP) standard interface or a cellular telecommunications industry association of the USA (cellular telecommunications industry association of the USA, CTIA) standard interface.

The pressure sensor 180. is configured to sense a pressure signal, and can convert the pressure signal into an electrical signal. In some embodiments, the pressure sensor 180A may be disposed on the display screen 194. There are a plurality of types of pressure sensors 180A, such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The electronic device 100 determines pressure intensity based on a capacitance change. When a touch operation is performed on the display screen 194, the electronic device 100 detects intensity of the touch operation through the pressure sensor 180A. The electronic device 100 may calculate a touch location based on a detection signal of the pressure sensor 180A. In some embodiments, touch operations that are performed at a same touch location but have different touch operation intensity may correspond to different operation instructions. For example, when a touch operation whose touch operation intensity is less than a first pressure threshold is performed on a Messages icon, an instruction for viewing an SMS message is executed. When a touch operation whose touch operation intensity is greater than or equal to the first pressure threshold is performed on the Messages icon, an instruction for creating a new SMS message is executed.

The gyro sensor 180E may be configured to determine a motion posture of the electronic device 100. In some embodiments, an angular velocity of the electronic device 100 around three axes (that is, axes x, y, and z) may be determined by using the gyro sensor 180B. The gyro sensor 180B may be configured to implement image stabilization during photographing. For example, when the shutter is pressed, the gyro sensor 180B detects an angle at which the electronic device 100 jitters, calculates, based on the angle, a distance for which a lens module needs to compensate, and allows the lens to cancel the jitter of the electronic device 100 through reverse motion, to implement image stabilization. The gyro sensor 180B may be used in a navigation scenario and a motion-sensing game scenario.

The barometric pressure sensor 180O is configured to measure barometric pressure. In some embodiments, the electronic device 100 calculates an altitude based on a value of the barometric pressure measured by the barometric pressure sensor 180C, to assist in positioning and navigation.

The magnetic sensor 180D includes a Hall sensor. The electronic device 100 may detect opening and closing of a flip cover by using the magnetic sensor 180D. In some embodiments, when the electronic device 100 is a clamshell phone, the electronic device 100 may detect opening and closing of a flip cover based on the magnetic sensor 180D. Further, a feature such as automatic unlocking upon opening of the flip cover is set based on a detected opening or closing state of the flip cover.

The acceleration sensor 180E may detect accelerations in various directions (usually on three axes) of the electronic device 100. When the electronic device 100 is still, a magnitude and a direction of gravity may be detected. The acceleration sensor 180E may be configured to identify a posture of the electronic device, and is used in an application such as switching between a landscape mode and a portrait mode or a pedometer.

The distance sensor 180F is configured to measure a distance. The electronic device 100 may measure a distance in an infrared manner or a laser manner. In some embodiments, in a photographing scenario, the electronic device 100 may measure a distance by using the distance sensor 180F, to implement quick focusing.

The optical proximity sensor 180G may include a light-emitting diode (LED) and an optical detector, for example, a photodiode. The light-emitting diode may be an infrared light-emitting diode. The electronic device 100 emits infrared light by using the light-emitting diode. The electronic device 100 detects infrared reflected light from a nearby object by using the photodiode. When sufficient reflected light is detected, the electronic device 100 may determine that there is an object near the electronic device 100. When insufficient reflected light is detected, the electronic device 100 may determine that there is no object near the electronic device 100. The electronic device 100 may detect, by using the optical proximity sensor 180G, that the user holds the electronic device 100 close to an ear for a call, to automatically turn off a screen for power saving. The optical proximity sensor 180G may also be used in a leather case mode or a pocket mode to automatically unlock or lock the screen.

The ambient light sensor 180L is configured to sense ambient light brightness. The electronic device 100 may adaptively adjust brightness of the display screen 194 based on the sensed ambient light brightness. The ambient light sensor 180L may also be configured to automatically adjust a white balance during photographing. The ambient light sensor 180L may also cooperate with the optical proximity sensor 180G to detect whether the electronic device 100 is in a pocket, to avoid an accidental touch.

The fingerprint sensor 180H is configured to collect a fingerprint. The electronic device 100 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the electronic device 100 executes a temperature processing policy based on the temperature detected by the temperature sensor 180J. For example, when the temperature reported by the temperature sensor 180J exceeds a threshold, the electronic device 100 lowers performance of a processor near the temperature sensor 180J, to reduce power consumption and implement thermal protection. In some other embodiments, when the temperature is less than another threshold, the electronic device 100 heats the battery 142 to prevent the electronic device 100 from being shut down abnormally due to a low temperature. In some other embodiments, when the temperature is less than still another threshold, the electronic device 100 boosts an output voltage of the battery 142 to avoid abnormal shutdown due to a low temperature.

The touch sensor 180K is also referred to as a "touch panel". The touch sensor 180K may be disposed on the display screen 194, and the touch sensor 180K and the display screen 194 form a touchscreen. The touch sensor 180K is configured to detect a touch operation performed on or near the touch sensor. The touch sensor may transfer the detected touch operation to the application processor to determine a type of a touch event. A visual output related to the touch operation may be provided through the display screen 194. In some other embodiments, the touch sensor 180K may alternatively be disposed on a surface of the electronic device 100 at a location different from a location of the display screen 194.

The keyboard 190 is an input device of the electronic device 100, and is configured to input an instruction and data to the electronic device 100. An English letter, a punctuation, a number, and the like may be input to the electronic device 100 through the keyboard 190. The keyboard 190 includes several keys. The electronic device 100 can receive a key input, and generate a key signal input related to user settings and function control of the electronic device 100.

The mouse 191 is an input device of the electronic device 100, and is configured to input an instruction to the electronic device 100. The mouse 191 is also an indicator for positioning horizontal and vertical coordinates of a display system of the electronic device 100. The mouse 191 can position a current cursor on a display screen and operate, through a mouse button or a scroll wheel apparatus, an element displayed at a location of the cursor.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or removed from the SIM card interface 195, to implement contact with or separation from the electronic device 100. The electronic device 100 may support one or N SIM card interfaces, where N is a positive integer greater than 1. The SIM card interface 195 may support a nano-SIM card, a micro-SIM card, a SIM card, and the like. A plurality of cards may be simultaneously inserted into a same SIM card interface 195. The plurality of cards may be of a same type or of different types. The SIM card interface 195 is compatible with different types of SIM cards. The SIM card interface 195 is also compatible with an external storage card. The electronic device 100 interacts with a network through the SIM card, to implement functions such as calling and data communication.

Figure 2:
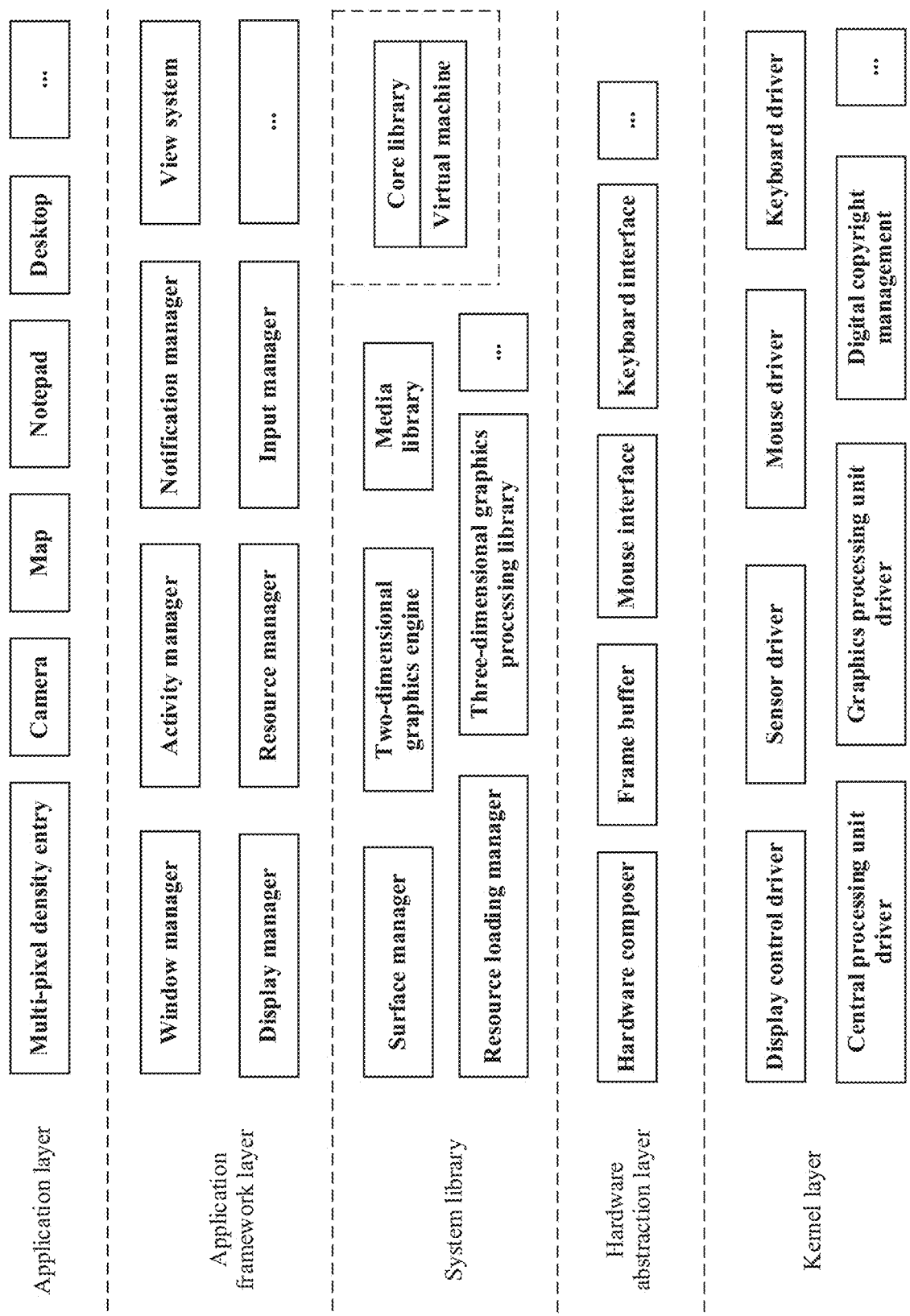
FIG. 2 is a block diagram of a software structure of an electronic device according to an embodiment of this application.

FIG. 2 is a block diagram of a software structure of the electronic device 100 according to an embodiment of this application.

In a layered architecture, software is divided into several layers, and each layer has a clear role and task. The layers communicate with each other through a software interface. As shown in FIG. 2, in some embodiments, an Android® system may be divided into five layers, which are respectively an application layer (applications), an application framework layer (applications framework), a system library (native libraries) and Android® runtime (Android® runtime), a hardware abstract layer (hardware abstract layer, HAL), and a kernel (kernel) layer from top to down.

The application layer (applications) may include a series of application packages.

As shown in FIG. 2, the application package may include applications (also referred to as applications) such as Camera, Map, Memo, and Desktop (launcher). In an embodiment of this application, a multi-pixel density entry (multi-DPI entry) control may be added to the application layer. For example, the multi-pixel density entry control may include an upscale (+) control and a downscale (−) control. When the upscale (+) control or the downscale (−) control is clicked through a mouse, an application may correspondingly scale a user interface. For details, refer to the following embodiments. Details are not described herein.

The application framework layer (applications framework) provides an application programming interface (application programming interface, API) and a programming framework for an application in the application layer. The application framework layer includes some predefined functions.

As shower in FIG. 2, the application framework layer may include a window manager (window manager), an activity manager (activity manager), a display manager (display manager), a resource manager (resource manager), an input manager (input manager), a notification manager (notification manager), a view system (views), and the like.

The window manager (window manager) is configured to manage a window program. The window manager may be configured to draw a size, a location region, and the like of a window, control to display or hidden a window, and manage a display order of a plurality of windows, and may also obtain a size of a display screen, determine whether a status bar exists, lock a screen, intercept a screen, and so on.

The activity manager (activity manager) is configured to manage a life cycle of an activity of an application, for example, managing an activity process such as creating, background, or destroying.

The display manager (display manager) is configured to manage a life cycle of display of an application, and can determine how to control logical display of the display manager based on a currently connected physical display device, and send a notification or the like to a system and an application when a state is changed.

The input manager (input manager) is configured to monitor and uniformly manage input events. For example, when a user makes input through a keyboard or a mouse, the input manager may detect invoking from a system and further forward or process a detected keyboard or mouse event.

The resource manager (resource manager) provides an application with access to various non-code resources, such as localized strings, icons, pictures, layout files, and video files. A resource management interface class ResourceImpl may be used as a resource management interface used for external connection. Through the interface class, an application resource can be updated.

The notification manager (notification manager) enables an application to display notification information in a status bar, and may be used to convey a message of a notification type. The message can automatically disappear after a short stay without user interaction. For example, the notification manager is configured to notify download completion, provide a message notification, and the like. The notification manager may alternatively be a notification that appears in a top status bar of the system in a form of a graph or a scroll bar text, for example, a notification of an application running on the background or a notification that appears on a screen in a form of a dialog window. For example, text information is displayed in the status bar, an announcement is given, the electronic device vibrates, or the indicator light blinks.

The view system (views) includes a visual control, such as a control for displaying text or a control for displaying a picture. The view system may be configured to construct an application. A display interface may include one or more views. For example, a display interface including a notification icon of Messages may include a text display view and a picture display view.

The Android® runtime (Android® Runtime) includes a kernel library and a virtual machine. The Android runtime is responsible for scheduling and management of the Android system.

The kernel library includes two parts: a function that needs to be called in Java language, and a kernel library of Android.

The application layer and the application framework layer run on a virtual machine. The virtual machine executes Java files at the application layer and the application framework layer as binary files. The virtual machine is configured to perform functions such as object lifecycle management, stack management, thread management, security and exception management, and garbage collection.

The system library (native libraries) may include a plurality of functional modules, for example, an interface manager (surface manager), a resource loading manager (asset manager), a media library (media libraries), a three-dimensional graphics processing library (such as OpenGL ES), and a two-dimensional graphics engine (such as SGL).

The interface manager (surface manager) is configured to manage a display subsystem and provides two-dimensional (2-Dimensional, 2D) and three-dimensional (3-Dimensional, 3D) image layer fusion for a plurality of applications. The interface manager may obtain a SurfaceFlinger service. The SurfaceFlinger service is a core of a graphical user interface (graphical user interface, GUI), and is responsible for mixing graphical data of all applications in sequence and outputting mixed graphical data to a buffer stream.

The resource loading manager (asset manager) is configured to load a resource class (Resources).

The media library supports playing and recording of a plurality of commonly used audio and video formats, static image files, and the like. The media library may support various audio and video coding formats, for example, MPEG-4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The hardware abstract layer (hardware abstract layer, HAL) is an interface layer located between an operating system kernel and a hardware circuit, and aims at abstracting hardware. The hardware abstract layer can encapsulate a Linux kernel driver, provide a standard interface upward, and hide implementation details of a relatively low-level driver. The HAL may include a hardware composer (hardware composer, HWC), a frame buffer (frame buffer), a mouse interface, a keyboard interface, a Bluetooth interface, a GPS interface, a Wi-Fi interface, an audio-video interface, a call interface, and the like.

The hardware composer (hardware composer, HWC) is configured to perform final composite display on a graphical data buffer stream composed by SurfaceFlinger.

The frame buffer (frame buffer) is a graphical buffer stream composed by the SurfaceFlinger service. The SurfaceFlinger service draws a user interface of an application by writing content into the frame buffer.

The mouse interface and the keyboard interface may be used to obtain corresponding data from a mouse driver and a keyboard driver.

The kernel layer (kernel) is a layer between hardware and software, and is used to provide core system services such as security, memory management, process management, a network protocol stack, and a drive model. The kernel layer may include a display control driver (display controller drive), a sensor driver (sensor driver), a central processing unit driver (CPU driver), a graphics processing unit driver (GPU driver), a mouse driver (mouse driver), a keyboard driver (keyboard driver), digital rights management (digital rights management, DRM), and the like. The driver communicates with a hardware device through a bus, controls hardware to enter various working states, and obtains a value of a register related to a device, thereby obtaining a state of the device. For example, the driver can be used to obtain user operation events such as a mouse input, a keyboard input, and rotation of an electronic device, and convert the events into data.

The digital rights management (digital rights management, DRM) is used to manage media class data in a bottom layer of an Android framework, and provide an effective copyright protection function such as audio/video encryption, document encryption, and the like for an Android platform, so that an application manages content in copyright protection based on a permission restriction condition associated with the content.

An example working procedure of software and hardware of the electronic device 100 is described with reference to a scenario of scaling display of an application.

Figures 2, 3A:
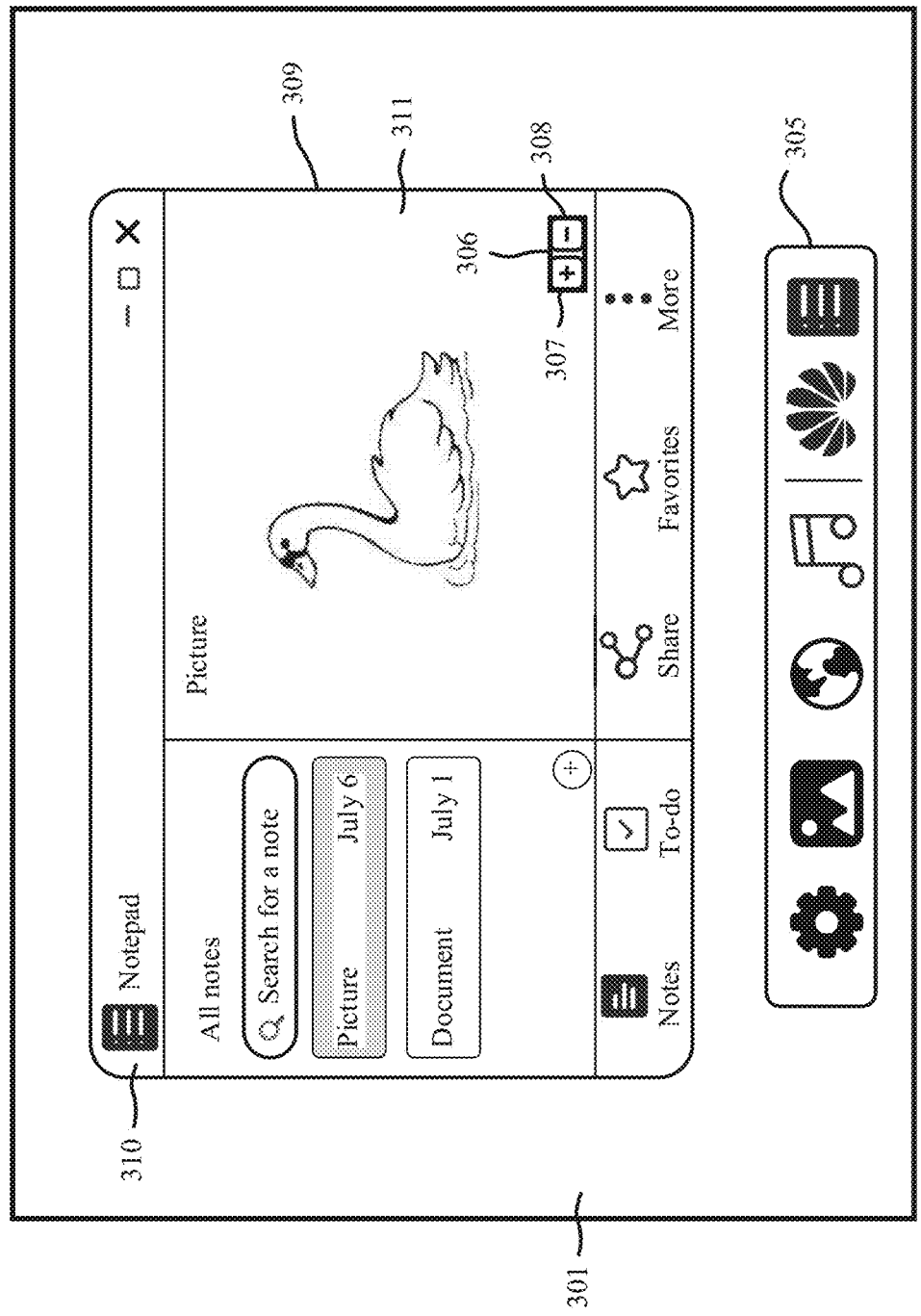

In an embodiment, the input event may be clicking a scale control in an application interface. In an example, as shown in FIG. 3a-1 and FIG. 3a-2, a scale control 306 may include an upscale (+) control 307 and a downscale (−) control 308. When the mouse 191 receives an operating of clicking a key, a corresponding hardware interrupt is sent to the kernel layer. The kernel layer processes the click operation into an original input event (including information such as coordinates of a mouse click and a time stamp of the click operation). The original input event is stored at the kernel layer. An input manager at an application framework layer obtains the original input event from the kernel layer, and identifies a control corresponding to the input event. For example, a Multi-DPI Entry control, that is, a scale control, is added to the application layer. For example, an event of clicking the upscale (+) control 307 corresponds to that a system display pixel density obtained by an application is decreased by a gradient, and an event of clicking a downscale (−) control 308 corresponds to that a system display pixel density obtained by an application is increased by a gradient. It should be noted that a change in the system display pixel density herein is not an event that really happens, but a cheat event provided to the application. Then, the resource manager delivers a processing event that is after a system display pixel density value changes to the resource loading manager to notify the application that a current application resource loading configuration item changes and an application resource needs to be refreshed. The resource loading manager further delivers the event to a Resources resource module, and the application reads a corresponding application resource through the Resources resource module. When the application resource is loaded, the window manager may need to update a size or location of an application window, and update a life cycle of a display activity. Then the display manager refreshes a window region after the window manager adjusts the size and location of the window and an active display interface. After the application resource is loaded and a window activity is updated, the interface manager mixes graphical data of the application in sequence through the SurfaceFlinger service to generate a graphical buffer stream, and outputs the graphical buffer stream to the frame buffer. The frame buffer further sends the graphical buffer stream to the hardware composer in the hardware abstract layer, and the hardware composer finally composes the graphical buffer stream. The hardware composer sends the final graphical data to a display, driver in the kernel layer for display by the display screen 194.

In another embodiment, the input event may be a combined input event of the keyboard 190 and the mouse 191, for example, simultaneously pressing a "ctrl" key on the keyboard 190 and sliding a scroll wheel of the mouse. When the keyboard 190 receives a press operation and the mouse 191 receives a slide operation whiling being slid, a corresponding hardware interrupt is sent to the kernel layer. The mouse driver and the keyboard driver in the kernel layer process the operations into an original input event and send the original input event to the mouse interface and the keyboard interface in the hardware abstract layer. The input manager in the application framework layer obtains the original input event from the mouse interface and the keyboard interface and identifies an instruction corresponding to the input event. For example, an event of simultaneously pressing the "ctrl" key and sliding the scroll wheel of the mouse upward corresponds to that a system display pixel density obtained by an application is decreased by a gradient, and an event of simultaneously pressing the "ctrl" key and sliding the scroll wheel of the mouse downward corresponds to that a system display pixel density obtained by an application is increased by a gradient. It should be noted that a change in the system display pixel density herein is not an event that really happens, but a cheat event provided to the application. The input manager forwards the input event to the resource management interface, and then the resource manager delivers a processing event that is after a system display pixel density value changes to the resource loading manager to notify the application that a current application resource loading configuration item changes and an application resource needs to be refreshed. The resource loading manager further delivers the event to a Resources resource module, and the application reads a corresponding application resource through the Resources resource module. When the application resource is loaded, the window manager may need to update a size or location of an application window, and update a life cycle of a display activity. Then the display manager refreshes a window region after the window manager adjusts the size and location of the window and an active display interface. After the application resource is loaded and a window activity is updated, the interface manager mixes graphical data of the application in sequence through the SurfaceFlinger service to generate a graphical buffer stream, and outputs the graphical buffer stream to the frame buffer. The frame buffer further sends the graphical buffer stream to the hardware composer in the hardware abstract layer, and the hardware composer finally composes the graphical buffer stream. The hardware composer sends the final graphical data to a display driver in the kernel layer for display, by the display screen 194.

In another embodiment, the input event may be a touch event. When the touch sensor 180K receives a touch operation in an application interface, a corresponding hardware interrupt is sent to the kernel layer. The kernel layer processes the touch operation into an original input event (including information such as touch coordinates, a time stamp of the touch operation, and a distance dragged by a touch). The original input event is stored at the kernel layer. The input manager at the application framework layer obtains the original input event from the kernel layer, and identifies an instruction corresponding to the input event. For example, the touch operation is a double-finger kneading operation, and the double-finger kneading operation occurs in a user interface of an application. The input manager forwards the touch input event to the resource management interface. For example, a double-finger touch gathering event corresponds to that a system display pixel density obtained by an application is increased by a gradient, and a double-finger touch opening event corresponds to that a system display pixel density obtained by an application is decreased by a gradient. It should be noted that a change in the system display pixel density herein is not an event that really happens, but a cheat event provided to the application. The resource manager delivers a processing event that is after a system display pixel density value changes to the resource loading manager to notify the application that a current application resource loading configuration item changes and an application resource needs to be refreshed. The resource loading manager further delivers the event to a Resources resource module, and the application reads a corresponding application resource through the Resources resource module. When the application resource is loaded, the window manager may need to update a size or location of an application window, and update a life cycle of a display activity. Then the display manager refreshes a window region after the window manager adjusts the size and location of the window and an active display interface. After the application resource is loaded and a window activity is updated, the interface manager mixes graphical data of the application in sequence through the SurfaceFlinger service to generate a graphical buffer stream, and outputs the graphical buffer stream to the frame buffer. The frame buffer further sends the graphical buffer stream to the hardware composer in the hardware abstract layer, and the hardware composer finally composes the graphical buffer stream. The hardware composer sends the final graphical data to a display driver in the kernel layer for display by the display screen 194.

The input event is not limited to an operation of clicking a scale control, an operation of pressing a key on a keyboard plus sliding a scroll wheel of a mouse, a double-finger kneading operation, and the like. The input event mentioned in the foregoing embodiment is merely an example, and constitutes no limitation on this application, provided that the objective described in this application can be achieved.

Some terms and concepts related to this application are described below

A pixel (pixel, PX) is a basic unit for image display. Pixels may have respective color values, which may be displayed by using three primary colors, for example, may be divided into three sub-pixels including a red pixel, a green pixel, and a blue pixel (RGB color gamut), or may be divided into a cyan pixel, a magenta pixel, a yellow pixel, and a black pixel (CMYK color gamut). An image is a collection of pixels. Generally, more pixels in a unit area indicate a higher resolution, and a displayed image is closer to a real object. On an electronic device, a quantity of pixels can be divided into a quantity of horizontal pixels and a quantity of vertical pixels. The quantity of horizontal pixels represents a quantity of pixels included in a horizontal direction, and the quantity of vertical pixels represents a quantity of pixels included in a vertical direction.

A screen size represents a physical size of a screen of an electronic device, may be represented by a diagonal length of the screen, and is in units of inches, where 1 inch=2.54 centimeters. For example, a size of a screen of a common mobile phone includes 3.5 inches, 4.2 inches, 5.0 inches, 5.5 inches, 6.0 inches, and the like; and a size of a display screen of a common PC includes 15.6 inches, 20.0 inches, 27.0 inches, and the like.

A resolution refers to a quantity of horizontal pixels and a quantity of vertical pixels, and is in units of px, where 1 px=1 pixel. The resolution may determine an amount of displayed information, and is measured by the quantity of horizontal pixels and the quantity of vertical pixels, to be specific, the resolution=the quantity of horizontal pixels*the quantity of vertical pixels, such as 1960*1080. For images of a same physical size, when the resolution is relatively low (such as 640*480), fewer pixels are displayed, a size of a single pixel is relatively large, and a display effect is relatively rough; or when the resolution is relatively high (such as 1600*1200), more pixels are displayed, a size of a single pixel is relatively small, and a display effect is relatively fine.

A screen pixel density (pixels per inch, PPI) may be used to represent a quantity of physical pixels per inch on a screen. A screen resolution describes a quantity of pixels of a display screen, and is an inherent physical hardware feature of a display and is unchangeable. A PPI calculation method is $$ppi = \frac{\sqrt{height^2 + width^2}}{size},$$

where the height and the width are respectively a quantity of pixels corresponding to a height of a display screen and a quantity of pixels corresponding to a width of the screen, and the size represents a diagonal length of the display screen and is in units of inches. To be specific, the calculation method means calculating a quantity of pixels of a diagonal by using the Pythagorean theorem based on the quantity of pixels of the height of the display screen and the quantity of pixels of the width of the display screen, and then dividing a calculated result by the size of the diagonal of the display screen to obtain the PPI. When a PPI value is higher, the display screen can display an image at a higher density, a fidelity in simulation is higher, and the displayed image is closer to a real image.

A display pixel density (dots per inch, DPI) is a quantity of pixels per inch that can be sampled, displayed, and output, and describes a pixel density during software display, which is a software attribute that can be configured. The DPI is related to an image size and an image resolution. In a case of a same image size, a higher image resolution indicates larger DPI. In a case of a same image resolution, a smaller image size indicates larger DPI. A higher DPI value indicates a clearer image. In a DPI calculation manner, a DPI value may be obtained by dividing a quantity of pixels in an image by a physical size. In addition, the DPI value may be obtained by using code:

```
float xdpi=getResources( ).getDisplayMetrics( ).xdpi;
float ydpi= getResources( ).getDisplayMetrics( ).ydpi;
```

In the foregoing code, xdpi represents horizontal dpi, and ydpi represents vertical dpi. Generally, xdpi and ydpi that are obtained are basically the same. Screen pixels on a display screen of an electronic device are in pursuit of even distribution, so that dpi should be the same for all of a width, a height, and a beveled side. Certainly, due to a technical limitation, some errors may occur.

A density independent pixel (density independent pixels, dp), also referred to as a density independent pixel, is a length occupied by one pixel on a screen of 160 dpi. The dpi is the screen pixel density. If there are 160 pixels per inch, a pixel density of this screen is 160 dpi. In Android®, it is specified that 160 dpi is used as a reference, and 1 dp=1 px=1/160 inch. If a density is 320 dpi, 1 dp=2 px, and so on. If a line of 320 px is drawn, the line is displayed on a mobile phone with a resolution of 480*800 by occupying ⅔ of a screen width, and occupies a full screen of a 320*480 mobile phone. If a unit of dp is used, 160 dp are displayed by using a half length of a screen in both resolutions.

A scale-independent pixel (scale-independent pixels, sp) is similar to the dp, but the sp is used as a word unit, which may be used to scale a word size based on settings in a system, and is a common unit for setting a font.

Pixel densities currently used in the mainstream include mdpi, hdpi, xdpi, xxdpi, and xxxdpi, and a distinguishing criterion in the industry is shown in Table 1 below.

TABLE 1

DPI distinguishing criterion

| Name | Pixel density range |
| --- | --- |
| ldpi | (0 dpi, 120 dpi) |
| mdpi | [120 dpi, 160 dpi) |
| hdpi | [160 dpi, 240 dpi) |
| xhdpi | [240 dpi, 320 dpi) |
| xxhdpi | [320 dpi, 480 dpi) |
| xxxhdpi | [480 dpi, 640 dpi) |

A system display resolution in the embodiments may be a resolution used in an actual display interface of an electronic device. The system display resolution may be a system display resolution adapted by the electronic device by default based on a detected size of a display, or may be a system display resolution customized by a user. Generally, the user may select different system display resolutions in a system setting option. The system display resolution of the electronic device is usually less than or equal to a screen resolution of a display screen. The screen resolution describes a quantity of pixels on the display screen, and is inherent to the display and is unchangeable. A system display pixel density, also referred to as system display dpi, can be calculated based on a screen size and the system display resolution.

Picture loading is used as an example herein to describe how an application loads a corresponding resource based on the system display pixel density. A related resource file may be located in a drawable folder and a values folder to distinguish between pictures and dimen values at different pixel densities. First, the system display dpi is obtained, and then a corresponding pixel density is found based on Table 1. For example, a display device has a screen resolution of 1080*1920 and a screen pixel density of 400 dpi, and there is a picture whose size is 270*480 pixels. Herein, the system display dpi is 400 dpi, which corresponds to xxhdpi based on Table 1. A system automatically preferably finds the corresponding picture in a drawable-xxhdpi folder. If the picture is found, the picture is loaded, and the picture is displayed on the display device in an original size in this case, that is, 270*480 pixels. If the picture is not found, the system finds the picture in an xxxhdpi folder with high dpi, and if until a folder with highest dpi, the picture is not found, the system searches a drawable-nodpi folder. The system does not sequentially query folders with low resolutions at the beginning, and queries folders in descending order until ldpi.

If a picture in an xxhdpi folder is cut into a drawable-mdpi folder, it can be found that the displayed picture becomes obviously larger. When loading a picture, the system first searches a corresponding folder for the picture, and further finds the picture in sequence until the drawable-mdpi folder. However, the system may consider that the picture is specifically designed for a low-density device. If the picture is directly used on a current high-density device, a pixel may be very low, so that the system automatically performs such an upscale operation. Using mdpi as a reference, a scaling multiple may be expressed as follows: drawable-mdpi:drawahle-hdpi:drawahle-xhdpi:drawable-xxhdpi:drawable-xxxhdpi=1:1.5:2:3:4, that is, a ratio of maximum values in a dpi range.

For how an application loads an application resource, in some embodiments, a Resources object is usually obtained through getResource( ). The Resource object is a global object in an application process, and is used to access an application resource. In addition to the Resources object, AssetManger may be obtained through getAsset( ) to read a file in a specified file path. "Resource" and "AssetManger" construct a foundation of a resource access framework.

The term "user interface" (user interface, UI) in the embodiments of this application is a media interface for interaction and information exchange between an application or an operating system and a user, and implements conversion between an internal form of information and a form acceptable to the user. A commonly used representation form of the user interface is a graphical user interface (graphic user interface, GUI), which refers to a computer operation-related user interface displayed graphically. The graphical user interface may be an interface element such as an icon, a window, or a control displayed on a display screen of an electronic device. The control may include visible interface elements such as an icon, a button, a menu, a tab, a text box, a dialog box, a status bar, a navigation bar, and a Widget.

Embodiments of some human-computer interaction interfaces in this application are described below with reference to the accompanying drawings.

In this application, when the electronic device 100 detects that a first user operation occurs in an interface of a first application, the first user operation correspondingly generates an event that a "virtual" system display pixel density changes. The first user operation may also be referred to as a first input operation. In some embodiments of this application, the "virtual system display pixel density" means that the system display pixel density is not a real pixel density used for interface display of a current system, but a cheat value provided to the first application to scale a user interface of the first application. The first application loads a corresponding application resource based on the obtained "virtual" system display pixel density, and the user interface of the first application changes accordingly, for example, a displayed font, control, picture, and the like are upscaled or downscaled. The first user operation may be a keyboard input event or a mouse input event, and the keyboard or mouse input event may generate a corresponding gradation value, for example clicking a scale control representing upscaling (+) or (−) downscaling through a mouse, or simultaneously pressing a "ctrl" key and sliding a scroll wheel of a mouse upward/downward, simultaneously pressing the "ctrl" key and a "▲"/"▼" key, and so on. The first user operation may be a touch event, for example, on a touchscreen, two fingers of a user gather/open the touchscreen in opposite directions. The first user operation may be a gesture operation event, such as a special gesture for raid-air recognition; or a user may customize the first user operation. The foregoing case is merely an example, and the first user operation is not limited in this embodiment of this application, provided that the objective described in this application can be achieved. The first application may respond to one or more different types of user operation events. There may not be a conflict between the user operations enumerated above, that is, a plurality of user operation manners may be simultaneously used as an event for triggering a function of scaling an application interface. For example, a user may click a scale control to scale an application interface, or may press a "ctrl" key and slide a scroll wheel of a mouse to scale an application interface, or may perform a finger kneading operation, a specific gesture operation, or the like on a touchscreen to scale an application interface. This is not limited in this application.

In some embodiments, a user may click a scale control to implement scaling display of an interface. FIG. 3a-1 and FIG. 3a-2 show a scenario in which clicking the scale control 306 is used as a user put event. As shown in FIG. 3a-1 and FIG. 3a-2, a user interface 301 of an electronic device may display a dock bar 305 and a user interface 302 of a first application, which is also referred to as an application interface 302. Herein, this embodiment is described by using an example in which the first application is Memo. The dock bar 305 may display an icon of a locked application and an icon of a recently started application, so that a user can quickly start the application. An operating system used by the electronic device is not limited in this embodiment of this application. The used operating system may be Android®, or may be other operating systems such as iOS and Linux, provided that the objective described in this application can be achieved.

The application interface 302 may further include a title bar 303 and an application content display region 304. Components of user interfaces for different applications may different, and some applications may be divided into more functional regions, for example, a toolbar, a menu bar, and the like may further be included.

The application interface 302 may display the scale control 306, and the scale control 306 may include the upscale (+) control 307 and the downscale (−) control 308. The scale control may be a floating control. The floating control is a control developed in a system, which has a display effect that the floating control floats over an entire user interface and is unnecessarily located in an application window. When the floating scale control is clicked, a current active window can respond to a corresponding instruction. The scale control may alternatively be a control embedded in an application window, and a display cycle of the control is bound to a life cycle of a window of a current application. For example, if the first application includes a plurality of sets of application resources, and an adaptation effect of jumping to and loading the application resource is relatively good, the scale control may be displayed in an application window of the first application, and the scale control may be clicked to control to scale an interface of the first application for display. If the first application does not have a plurality of sets of application resources or an adaptation effect of jumping to and loading the application resource is not good, the scale control may not be displayed in the application window of the first application, to avoid troubling a user, in this way, design of a user interface is more human centered. A pattern of the scale control 306 is not limited in this application, and FIG. 3a-1 and FIG. 3a-2 are merely an example. A specific pattern is available provided that the pattern can implement the function described in this embodiment.

As shown in FIG. 3a-1 and FIG. 3a-2, when the upscale control 307 is clicked, the first application learns that a system display pixel density grades down to a next value lower than a current system display pixel density, and then the first application loads a corresponding application resource, and the application interface 302 correspondingly changes to an upscaled application interface 309. Compared with the application interface 302, in the application interface 309, a display word, picture, control and the like are upscaled, including an upscaled title bar 310 and an upscaled application content display region 311. This is different from a scaling function of the application. Some applications have a scaling function, for example, applications such as Word and Excel. Generally, scaling only means scaling parts such as an application content display region, a title bar, a menu bar, a toolbar, and the parts are not scaled in a same proportion.

The scale control 306 is unnecessarily displayed in an application interface of each application. For example, the scale control 306 may be displayed in a user interface of an application when it is detected that the application has a plurality of sets of application resources and can switch between and load different application resources. If some applications do not support a plurality of sets of application resources, or if some applications are easily crashed when switching and loading an application resource, the scale control 306 may not be displayed in user interfaces of these applications to avoid causing an unnecessary trouble to a user. For how to determine a specific application whose application interface can display the scale control 306, applications may be classified. For example, an application adapted well to the scaling function described in this application is put into a "whitelist" through classification, and an application that does not have a plurality of sets of application resources or that does not adapt well to the scaling function described in this application is put into a "blacklist" through classification. An application interface of the application in the "whitelist" can display the scale control 306, and an application interface of the application in the "blacklist" unnecessarily displays the scale control 306. This is not limited in this application.

Figures 1, 3B:
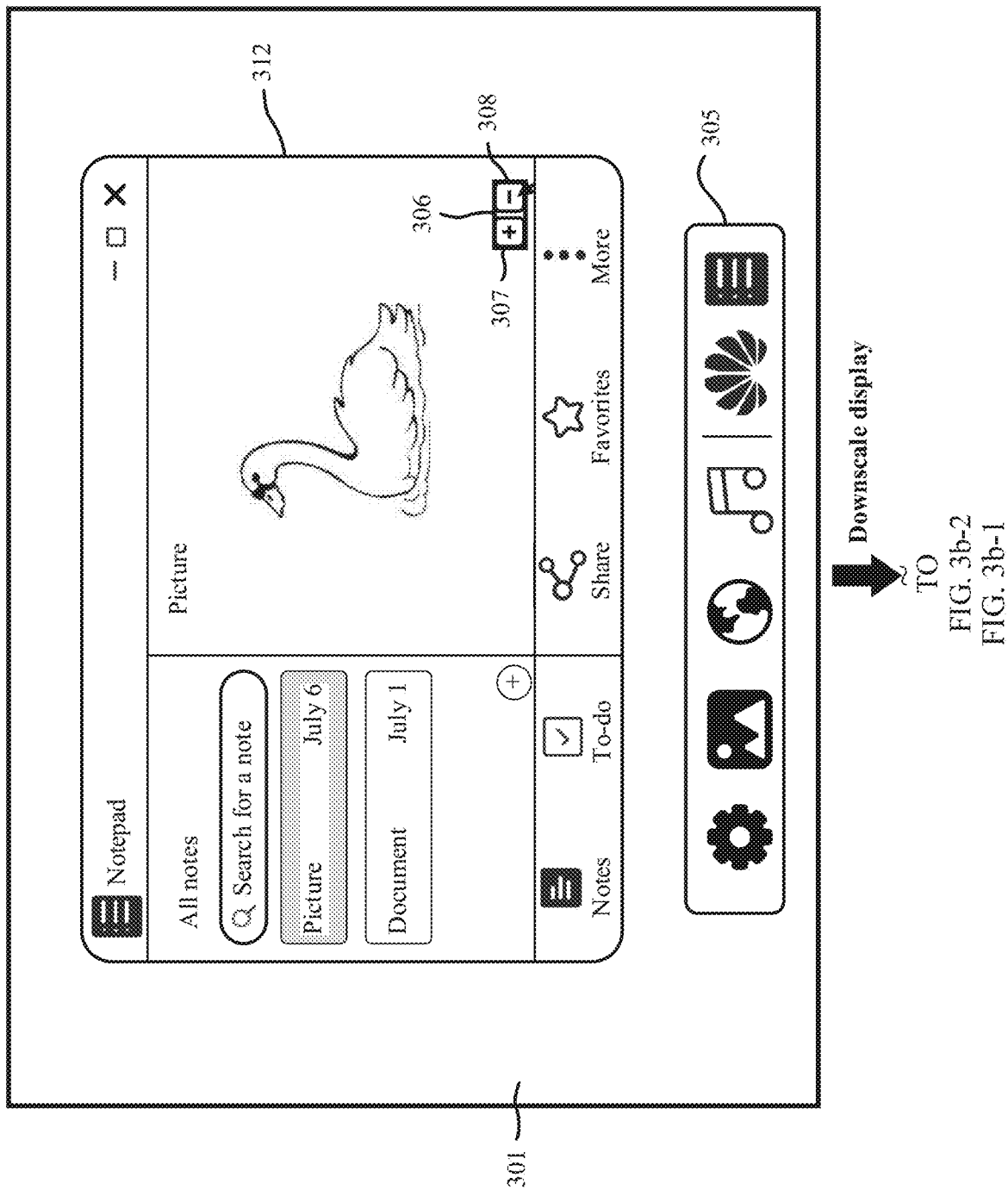
Figures 2, 3B:
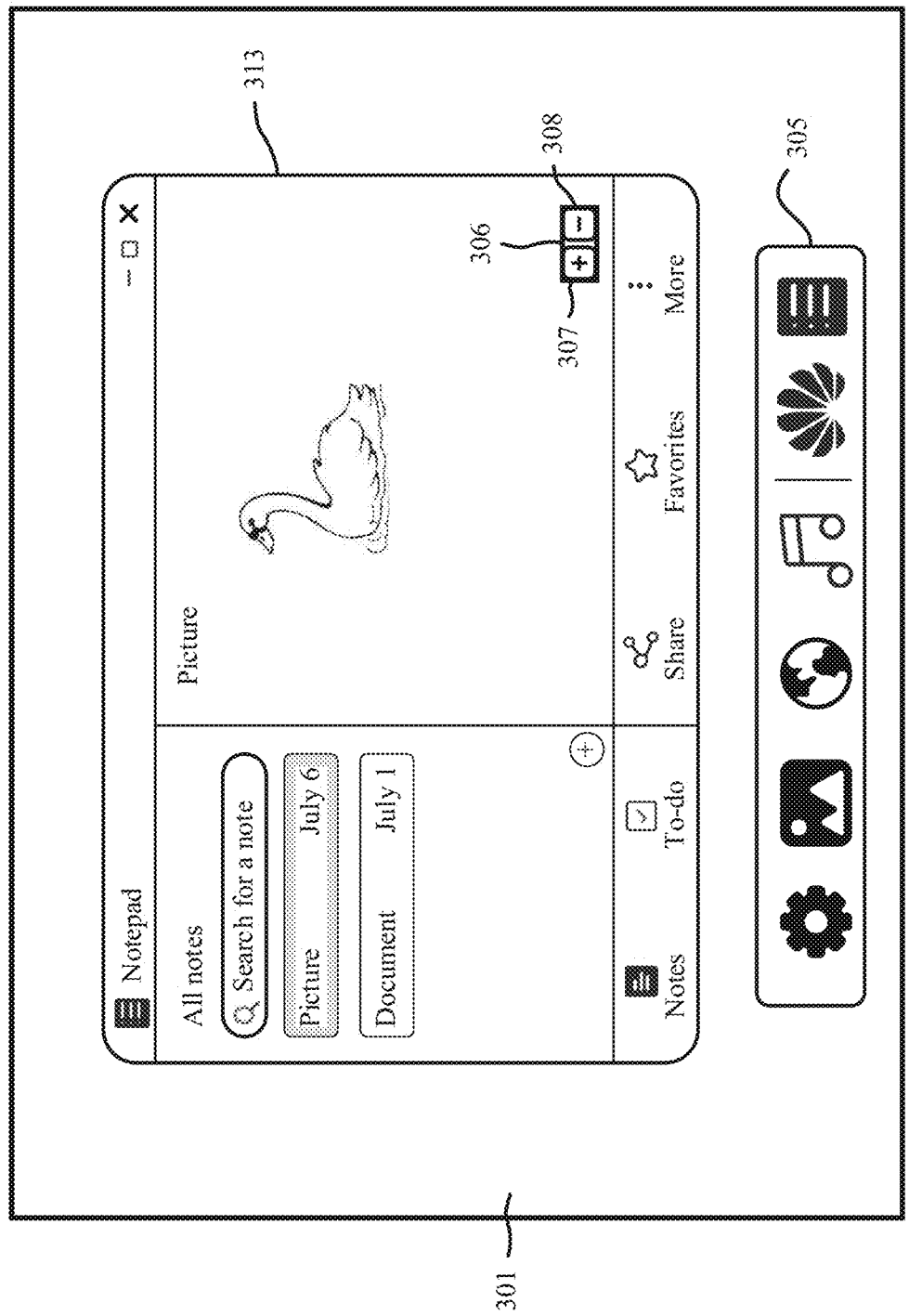

Downscaling an application interface is similar to upscaling an application interface. As shown in FIG. 3b-1 and FIG. 3b-2, when the downscale control 308 is clicked, the first application learns that a system display pixel density grades up to a next value higher than a current system display pixel density, and then the first application loads a corresponding application resource, and an application interface 312 correspondingly changes to a downscaled application interface 313. Correspondingly, compared with the application interface 312, in the application interface 313, a displayed word, picture, control, and the like are all downscaled.

Figure 3C:
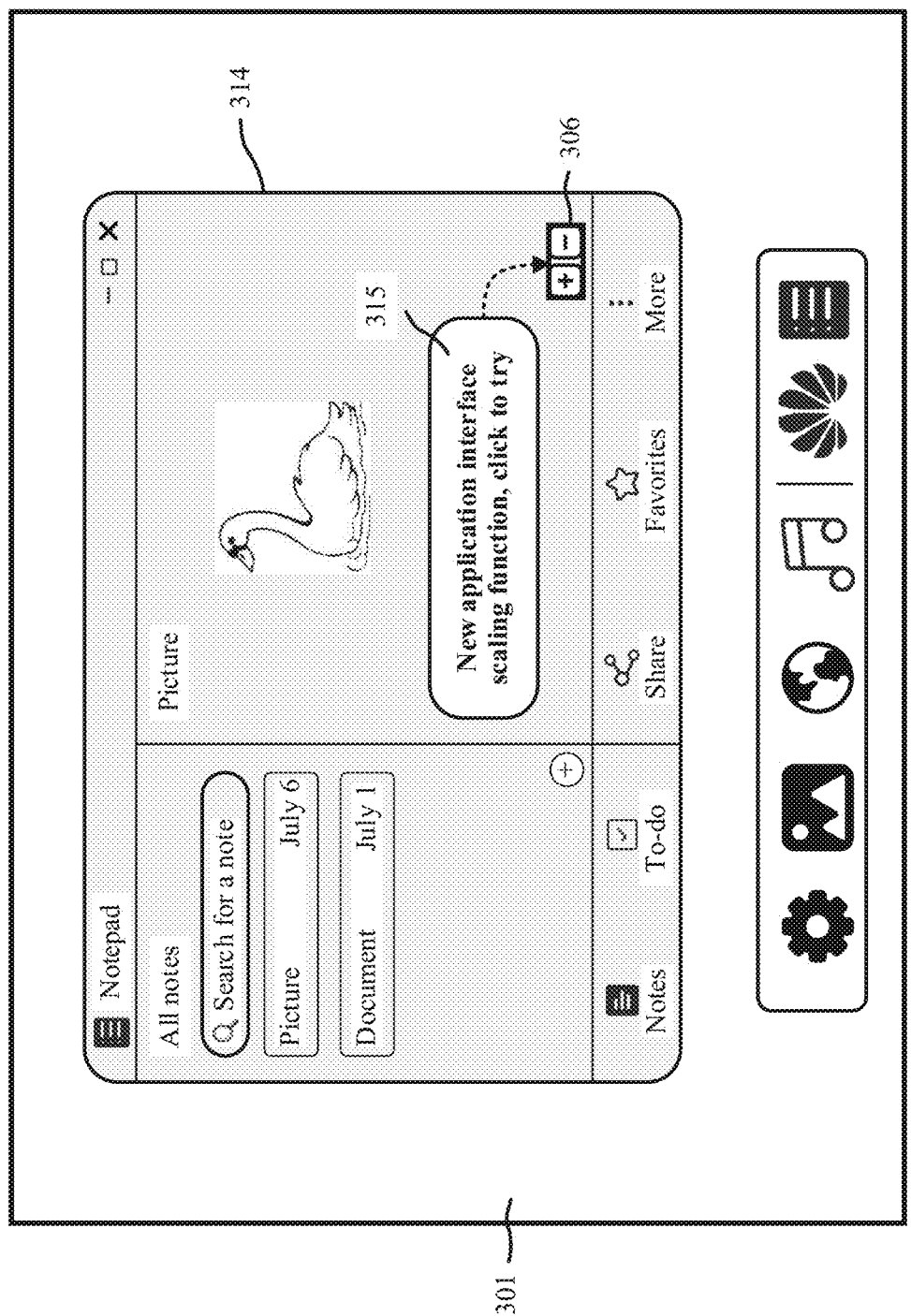
FIG. 3c is a schematic diagram of a user interface according to an embodiment of this application.

As shown in FIG. 3c, when a user opens the first application for the first time, an application interface 314 may display guide text 315, for example, the guide text 315 may be "New application interface scaling function, click to try", and points to the scale control 306 to guide the user to understand the scaling function. The guide interface shown in FIG. 3c is merely an example, and is not limited to the guide text. A picture, an animation presentation, or the like may be used to guide a user to understand the scaling function. This is not limited in this application, provided that an objective of guiding the user can be achieved.

Figures 1, 4A:
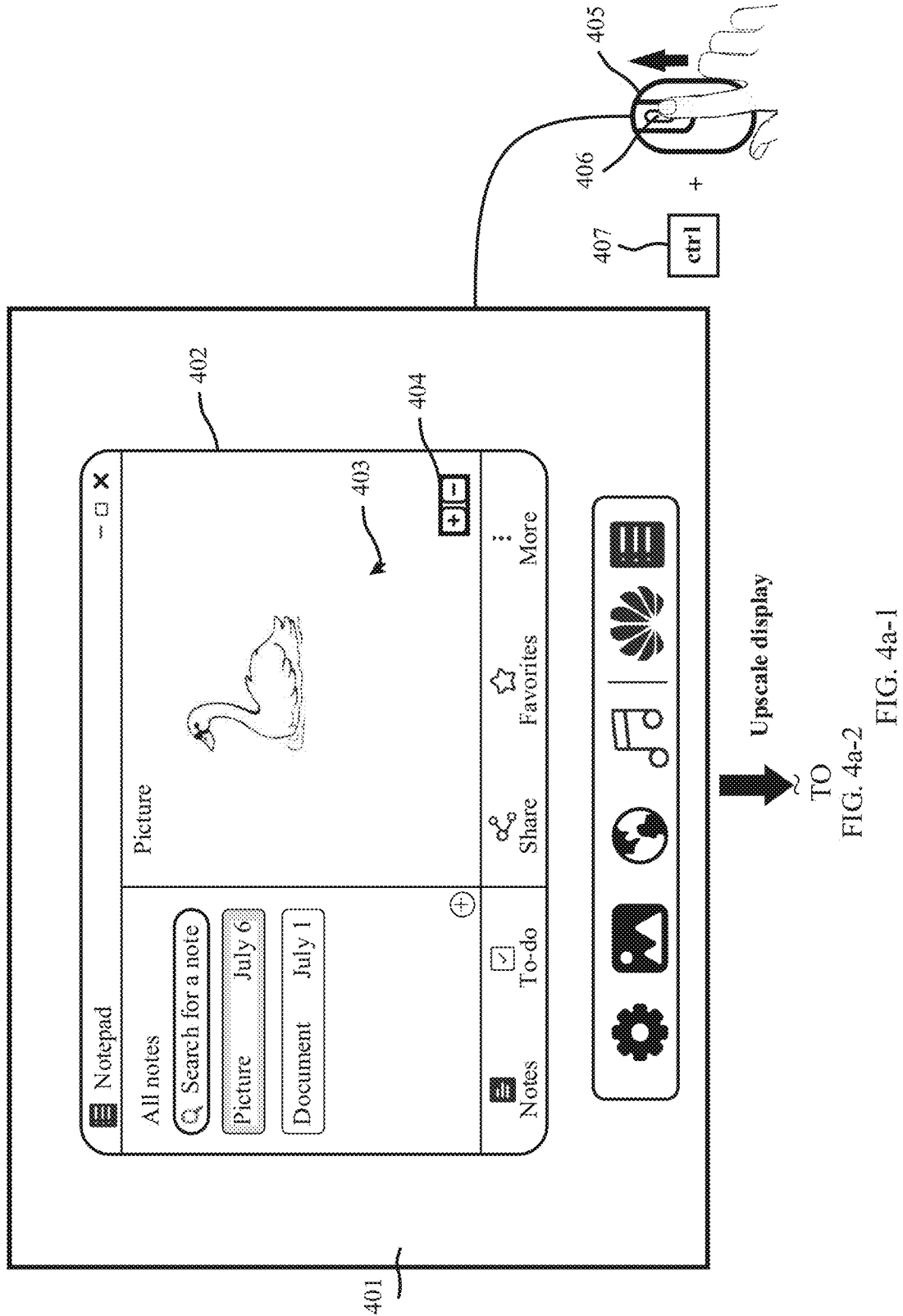
Figures 2, 4A:
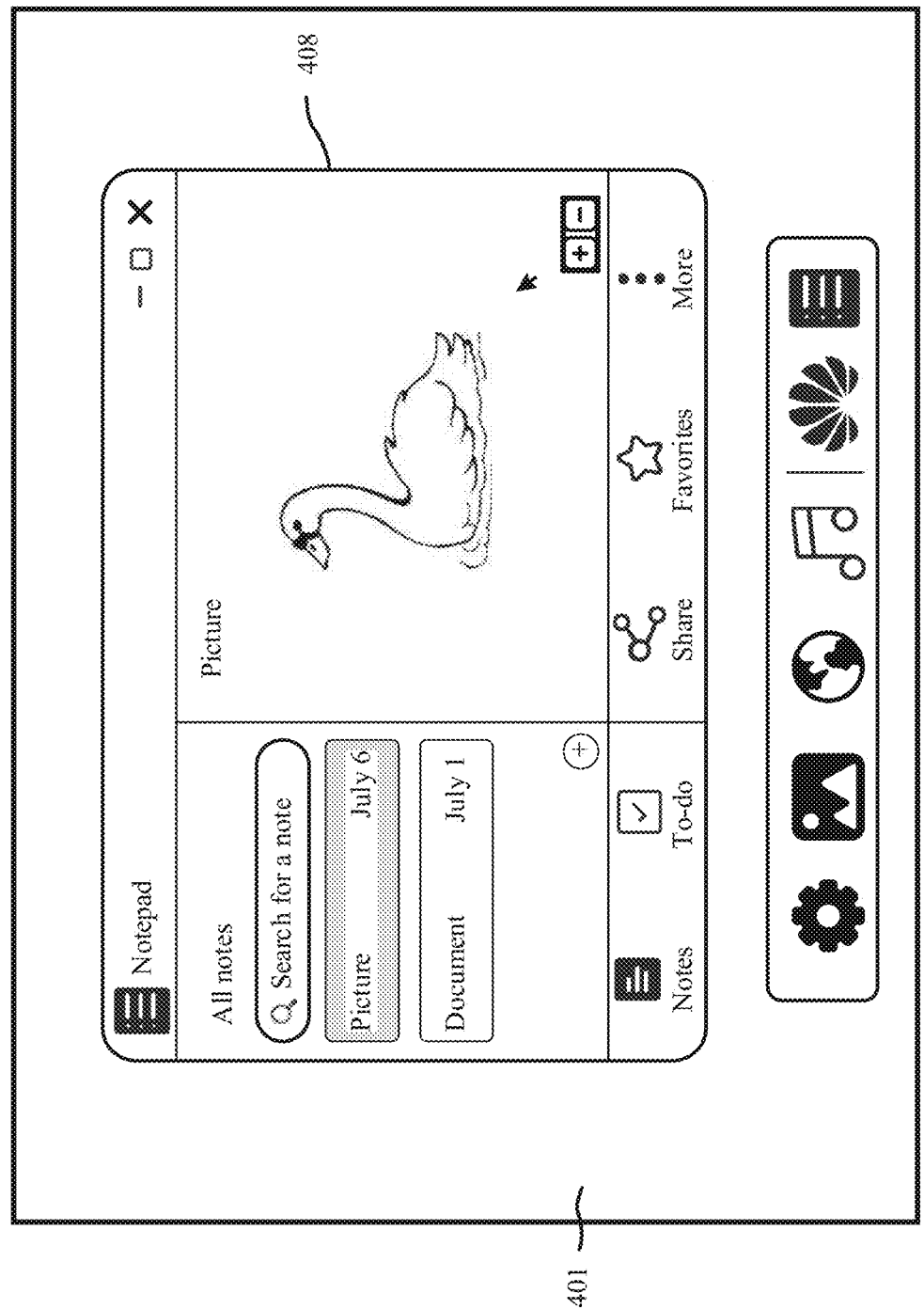

In addition to clicking the scale control 306, the first user operation may be simultaneously pressing a "ctrl" key and sliding a scroll wheel of a mouse upward, simultaneously pressing the "ctrl" key and a "▲" key, and so on. FIG. 4a-1 and FIG. 4a-2 show a scenario in which simultaneously pressing a "ctrl" key 407 and sliding a scroll wheel 406 of a mouse upward is used as a user input event.

As shown in FIG. 4a-1 and FIG. 4a-2, a user interface 401 of an electronic device may display a user interface 402 of a first application, which is also referred to as an application interface 402. The electronic device is externally connected to a keyboard and a mouse 405. When a mouse pointer 403 is displayed in the application interface 402, a user simultaneously presses the "ctrl" key 407 and slides the scroll wheel 406 of the mouse upward. In this case, the first application learns that a system display pixel density grades down to a next value lower than a current system display pixel density, and then the first application loads a corresponding application resource, and the application interface 402 correspondingly changes to an upscaled application interface 408. Compared with the application interface 402, in the application interface 408, a displayed word, picture, control, and the like are all upscaled. In addition, the application interface 402 may further display a scale control 404. To be specific, the scale control 404 may be clicked to scale an application interface, or the "ctrl" key 407 may be pressed and the scroll wheel of the mouse may be slid to scale an application interface. The two scaling manners are not conflicted with each other and may coexist.

Figures 2, 4B:
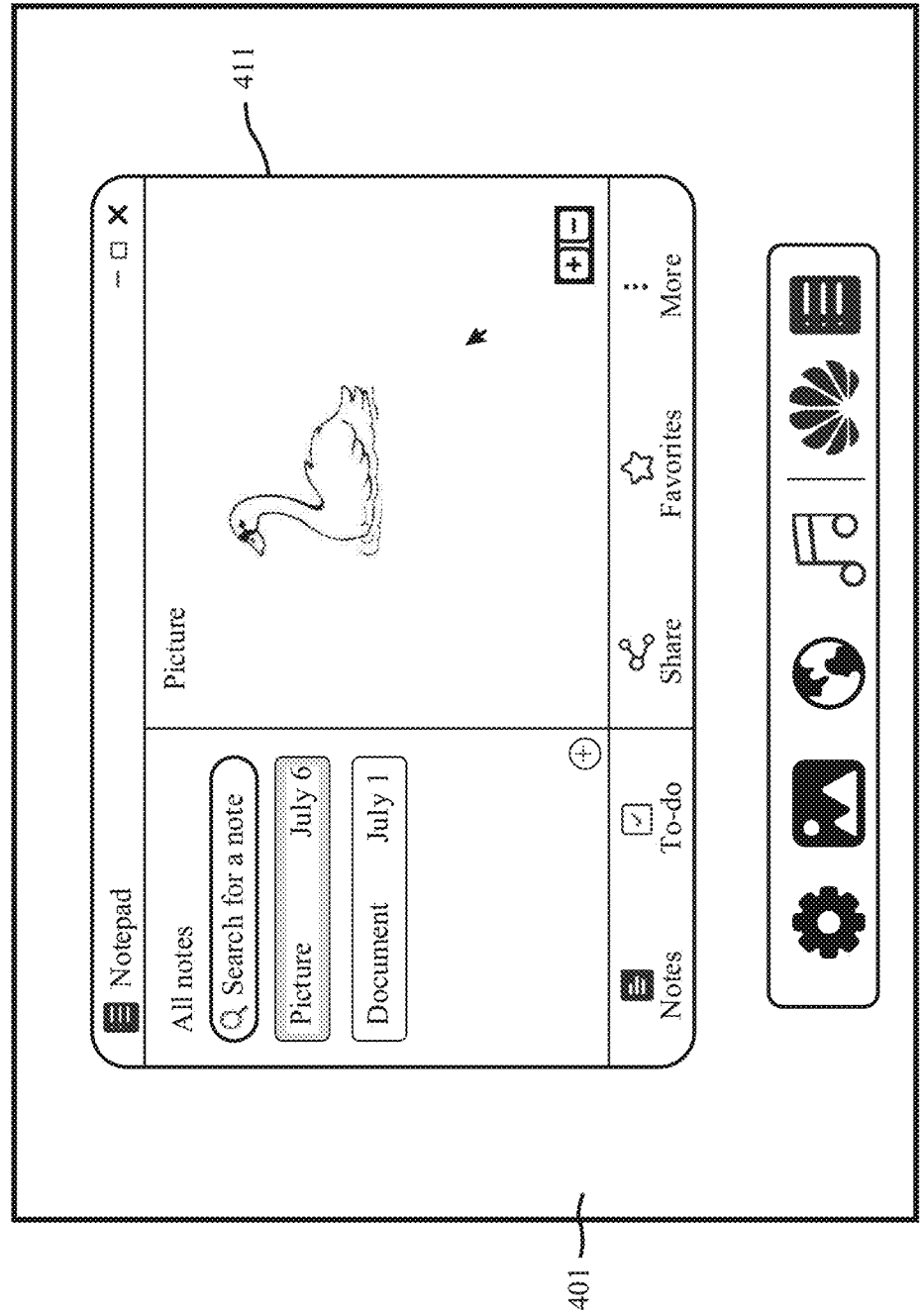

Downscaling an application interface is similar to upscaling an application interface. As shown in FIG. 4b-1 and FIG. 4b-2, when the mouse pointer 403 is displayed in an application interface 409, a user simultaneously presses the "ctrl" key 407 and sliding a scroll wheel 410 of the mouse downward. In this case, the first application learns that a system display pixel density grades up to a next value higher than a current system display pixel density, and then the first application loads a corresponding application resource, and the application interface 409 correspondingly changes to a downscaled application interface 411. Compared with the application interface 409, in the application interface 411, a displayed word, picture, control, and the like are all downscaled.

Similarly, not all applications correspond to an event of pressing a "ctrl" key and sliding a scroll wheel of a mouse.

As described in the foregoing embodiment, applications may be classified, for example a "whitelist" and a "blacklist" are set. An application adapted well to the scaling function described in this application is put into the "whitelist" through classification, and an application that does not have a plurality of sets of application resources or that does not adapt well to the scaling function described in this application is put into the "blacklist" through classification. An application interface of the application in the "whitelist" can respond to the event of pressing a "ctrl" key and sliding a scroll wheel of a mouse, and an application interface of the application in the "blacklist" does not respond to the event of pressing a "ctrl" key and sliding a scroll wheel of a mouse. This is merely an example for description, and is not limited in this application.

Figure 4C:
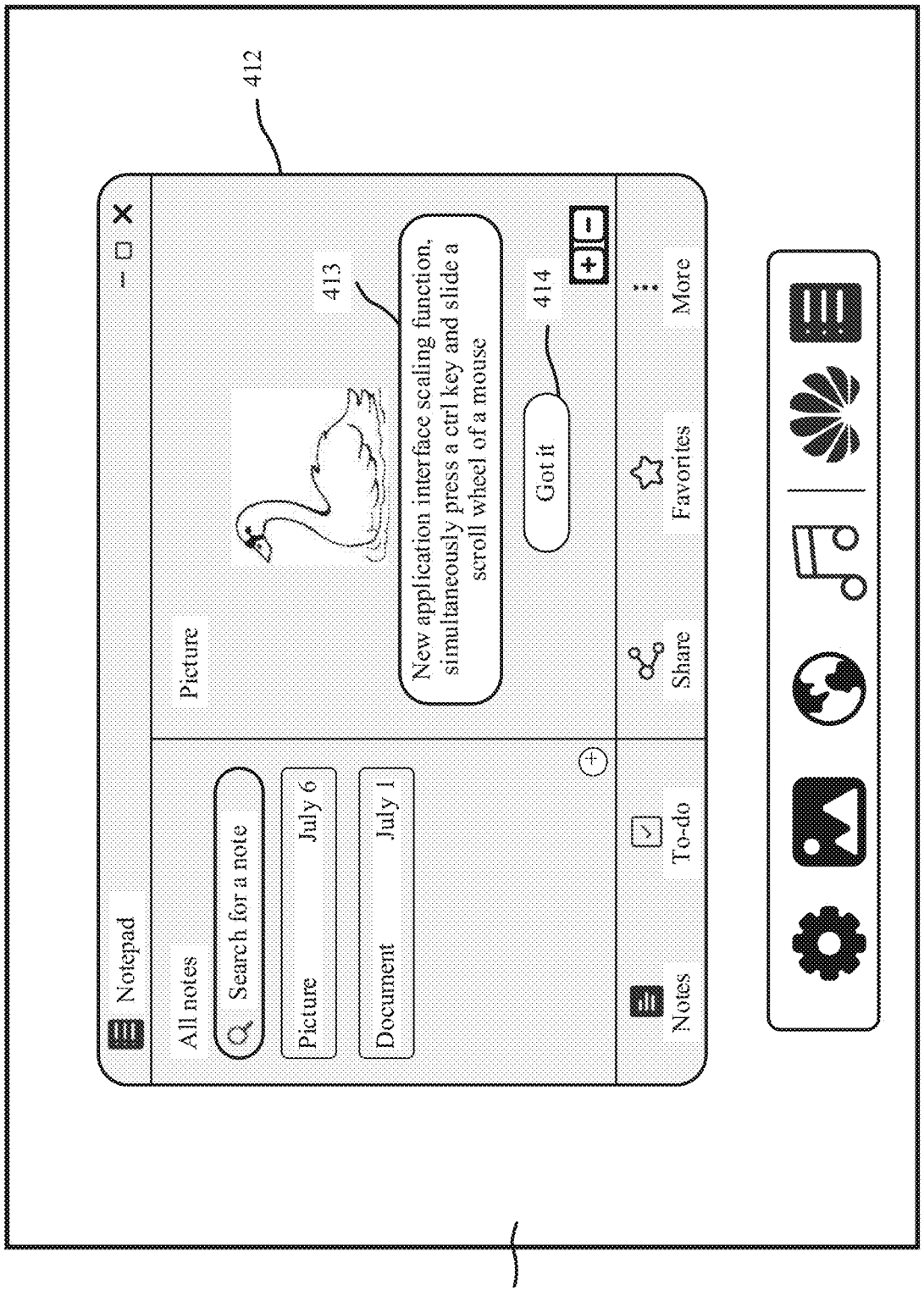
FIG. 4c is a schematic diagram of a user interface according to an embodiment of this application.

As shown in FIG. 4c, when a user opens the first application for the first time, an application interface 412 may display guide text 413, for example, the guide text 413 may be "New application interface scaling function, simultaneously press a ctrl key and slide a scroll wheel of a mouse to enter a quick application interface", to guide the user to understand the scaling function. The application interface 412 may further display a dialog box 414 "I know". When the user clicks the dialog box 414 "I know", it indicates that the user knows the scaling function. In this case, the guide text 413 disappears, and the first application enters a normal application interface. The guide interface shown in FIG. 4c is merely an example, and is not limited to the guide text. A picture, an animation presentation, or the like may be used to guide a user to understand the scaling function. This is not limited in this application, provided that an objective of guiding the user can be achieved.

Figures 2, 5A:
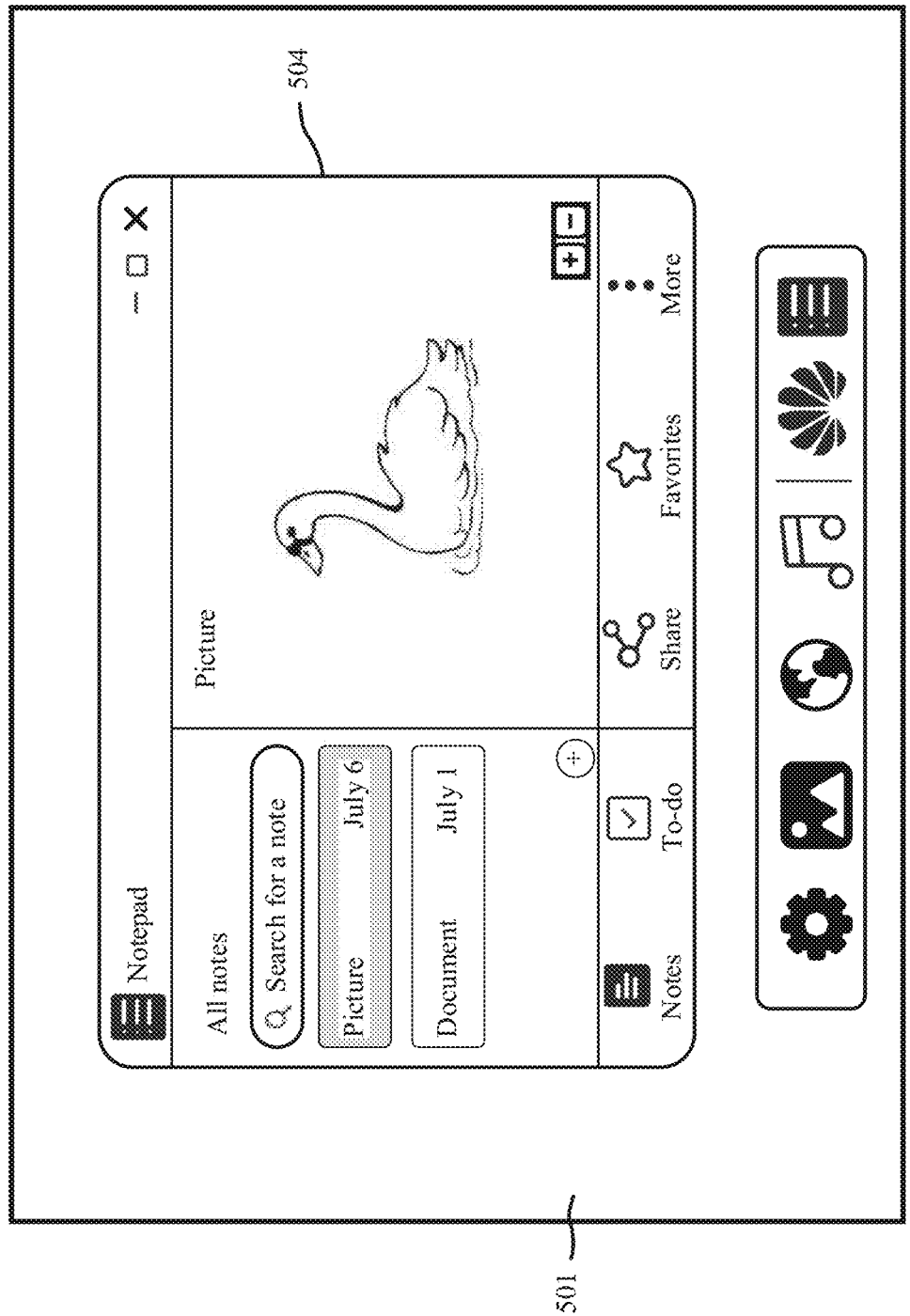

FIG. 5a-1 and FIG. 5a-2 show a scenario in which a finger kneading operation of a user on a touchscreen is used as a user input event. As shown in FIG. 5a-1 and FIG. 5a-2, a user interface 501 of an electronic device may display a user interface 502 of a first application, which is also referred to as an application interface 502. A display screen of the electronic device may be a touchable screen, which can correspond to a touch operation. When two fingers of a user simultaneously touch a region in the application interface 502 on the touchscreen, and open (503) the touchscreen by a specific distance in opposite directions, the first application learns that a system display pixel density grades down to a next value lower than a current system display pixel density, and then the first application loads a corresponding application resource, and the application interface 502 correspondingly changes to an upscaled application interface 504. Compared with the application interface 502, in the application interface 504, a displayed word, picture, control, and the like are all upscaled. In addition, the application interface 502 may further display a scale control 505. To be specific, an application interface may be scaled in a plurality of manners, for example, as described above, the scale control 505 is clicked to scale an application interface, a "ctrl" key may be pressed and a scroll wheel of a mouse may be slid to scale an application interface, and a gesture operation, a touch operation, or the like may be used. The several manners are not conflicted with each other.

Downscaling an application interface is similar to upscaling an application interface. As shown in FIG. 5b-1 and FIG. 5b-2, when two fingers of a user simultaneously touch a region in an application interface 506 on the touchscreen, and gather (507) the touchscreen by a specific distance in opposite directions, the first application learns that a system display pixel density grades up to a next value higher than a current system display pixel density, and then the first application loads a corresponding application resource, and the application interface 506 correspondingly changes to a downscaled application interface 508. Compared with the application interface 506, in the application interface 508, a displayed word, picture, control, and the like are all downscaled.

Similarly, not all applications correspond to the finger kneading operation of a user. As described in the foregoing embodiment, applications may be classified, for example a "whitelist" and a "blacklist" are set. An application adapted well to the scaling function described in this application is put into the "whitelist" through classification, and an application that does not have a plurality of sets of application resources or that does not adapt well to the scaling function described in this application is put into the "blacklist" through classification. An application interface of the application in the "whitelist" can respond to the finger kneading operation of a user, and an application interface of the application in the "blacklist" does not respond to the finger kneading operation of a user. This is merely an example for description, and is not limited in this application.

Figure 5C:
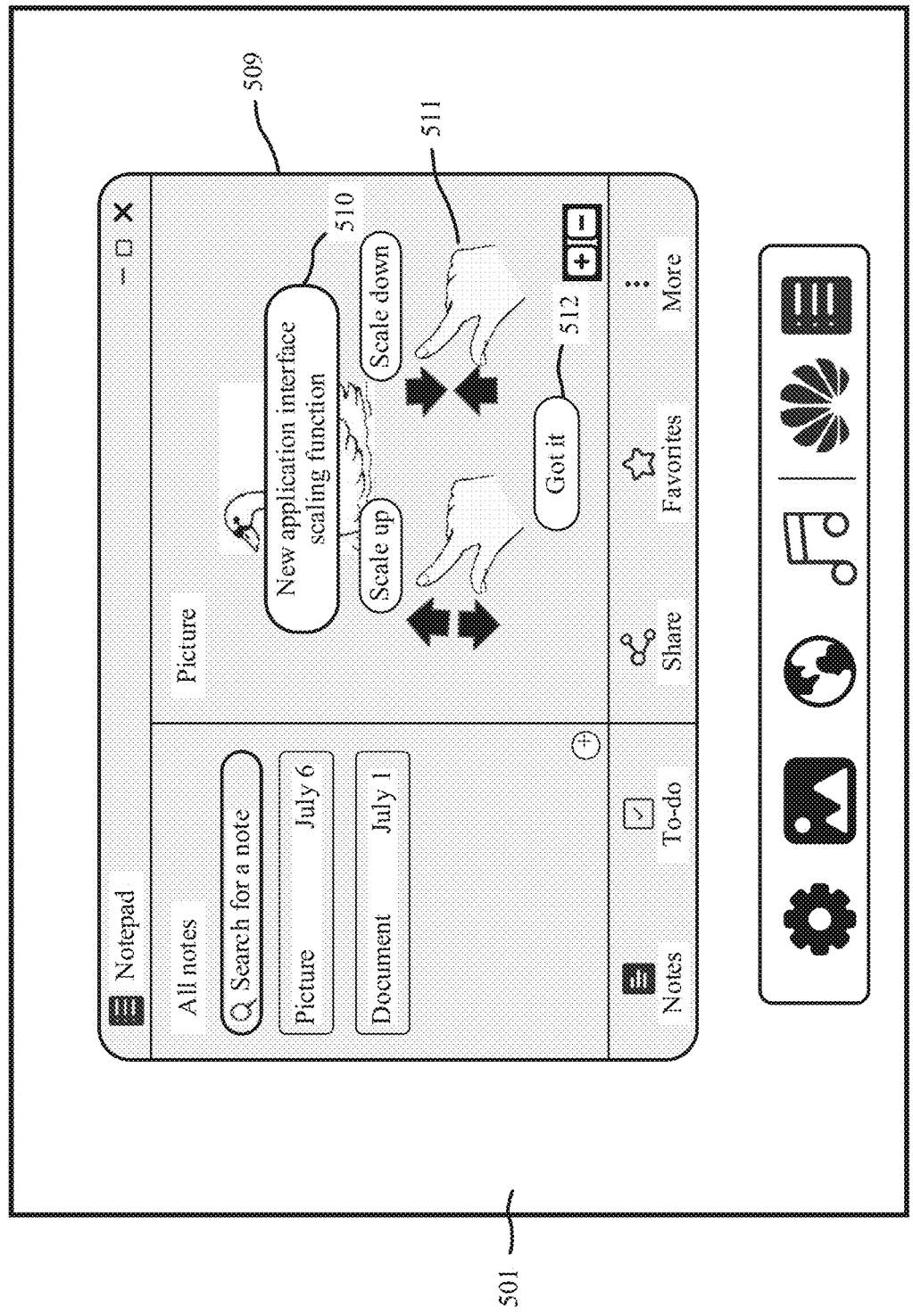
FIG. 5c is a schematic diagram of a user interface according to an embodiment of this application.

As shown in FIG. 5c, when a user opens the first application for the first time, an application interface 509 may display guide text 510, for example, the guide text 510 may be "New application interface scaling function", and provide a user operation guide pattern 511 corresponding to upscaling/downscaling an application interface. The application interface 509 may further display a dialog box 512 "I know". When the user clicks the dialog box 512 "I know", it indicates that the user knows the scaling function. In this case, the guide text 510 and the guide pattern 511 disappear, and the first application enters a normal application interface. The guide interface shown in FIG. 5c is merely an example. The guide interface shown in FIG. 5c constitutes no limitation on this application, and any function that can guide a user falls within the scope of this application.

Figures 2, 6A:
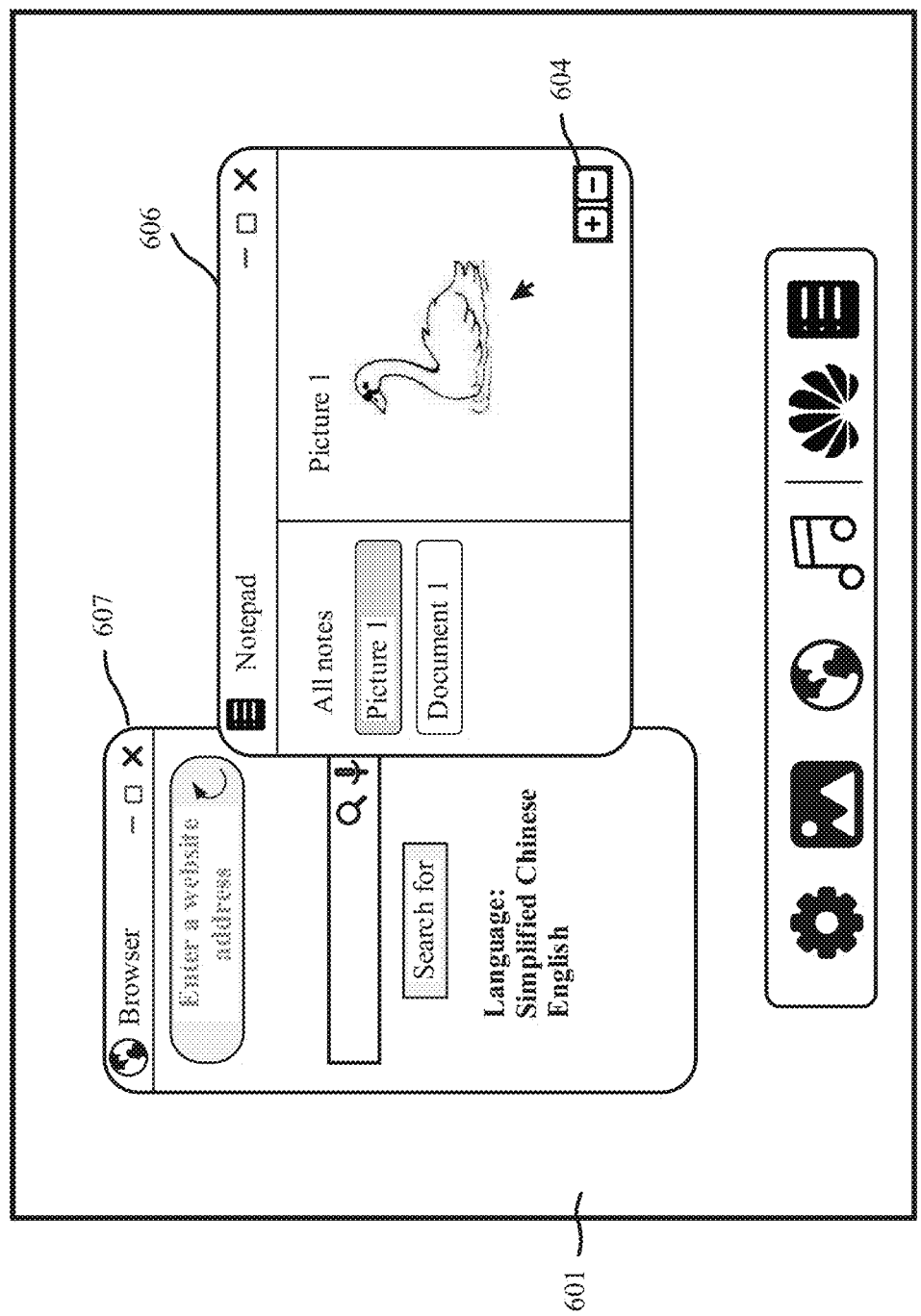

FIG. 6a-1 and FIG. 6a-2 show a scenario in which a scaling operation is responded to in a plurality of windows. In some embodiments, as shown in FIG. 6a-1 and FIG. 6a-2, a user interface 601 of an electronic device may display a user interface 602 of a first application and a user interface 603 of a second application, which may also be referred to as a first application interface 602 and a second application interface 603. A mouse pointer is located in the first application interface 602, and a window of the first application is a current active window. An active window is a top-layer window of an application, that is, a window that is currently in use. Generally, only one top-layer window in a system can be an active window. A user may activate a top-layer window by clicking a window, using a specially specified key such as a combined key of ALT+TAB or ALT+ESC, or invoking a function SetActiveWindow.

In some embodiments, the user interface 601 may further display a scale control 604, and a user may click the scale control 604 to scale an interface. In FIG. 6a-1 and FIG. 6a-2, a user may control a mouse pointer 605 to click an upscale (+) control in the scale control 604, and then the current active window that is, the first application, learns that a system display pixel density grades down to a next value lower than a current system display pixel density, and then the first application loads a corresponding application resource, and an interface element in the first application interface 602 is correspondingly upscaled, for example, a first application interface 606 is displayed. Compared with the first application interface 602, in the first application interface 606 displayed after upscaling, a displayed word, picture, control, and the like are all upscaled. However, the second application interface 603 is not a current active window, and therefore does not respond to an upscale operation. Therefore, a display size of an interface element in the second application interface 602 is unchanged, that is, a second application interface 607 displayed after the upscale operation is consistent with the second application interface 603.

Figures 2, 6B:
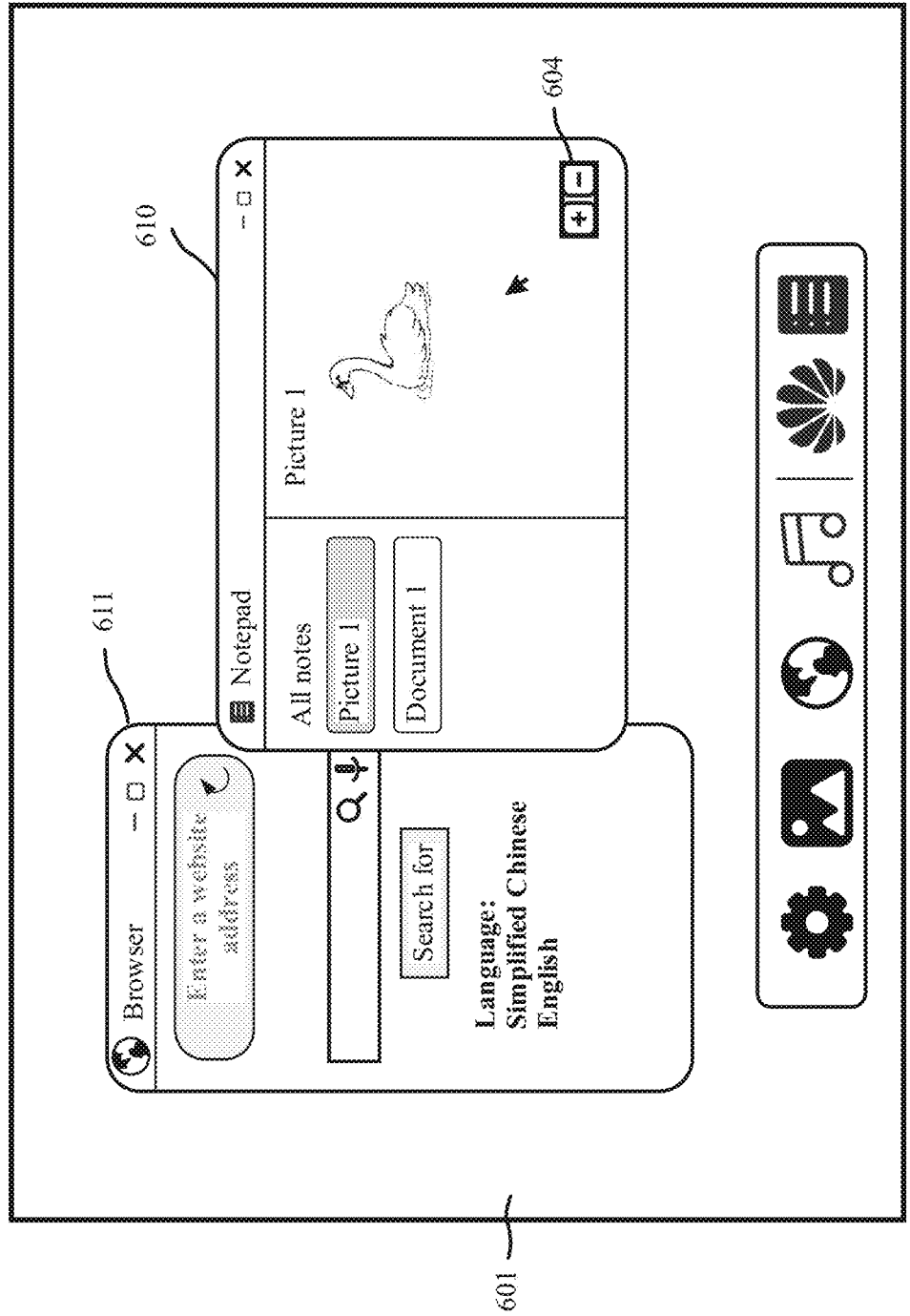

Downscaling an application interface is similar to upscaling an application interface. As shown in FIG. 6b-1 and FIG. 6b-2, the user interface 601 may display a first application interface 608 and a second application interface 609, and the scale control 604. When a user controls a mouse pointer 608 to click a downscale (−) control in the scale control 604, the current active window, that is, the first application, learns that a system display pixel density grades up to a next value higher than a current system display pixel density, and then the first application loads a corresponding application resource, and an interface element in the first application interface 608 is correspondingly downscaled, for example, a first application interface 610 is displayed. Compared with the first application interface 608, in the first application interface 610 displayed after downscaling, a displayed word, picture, control, and the like are all downscaled. However, the second application interface 609 is not a current active window, and therefore does not respond to a downscale operation. Therefore, a display size of an interface element in the second. application interface 609 is unchanged, that is, a second application interface 611 displayed after the downscale operation is consistent with the second application interface 610.

It can be understood that the application interfaces shown in FIG. 3a-1 and FIG. 3a-2, FIG. 3b-1 and FIG. 3b-2, FIG. 3c. FIG. 4a-1 and FIG. 4a-2, FIG. 4b-1 and FIG. 4b-2, FIG. 4c, FIG. 5a-1 and FIG. 5a-2, FIG. 5b-1 and FIG. 5b-2, FIG. 5c, FIG. 6a-1 and FIG. 6a-2, and FIG. 6b-1 and FIG. 6b-2 constitute no limitation on other embodiments of this application. In the other embodiments of this application, a component may be added or deleted, a style of a component may be changed, or other implementations may be used, which are not limited to the foregoing embodiments. Specific implementation may be adjusted and set based on a specific situation, which is not limited in this application, provided that a function of scaling an application interface described in this application can be implemented.

Based on some of the foregoing embodiments, an application interface display method provided in this application is described below.

Embodiment 1

Figure 7:
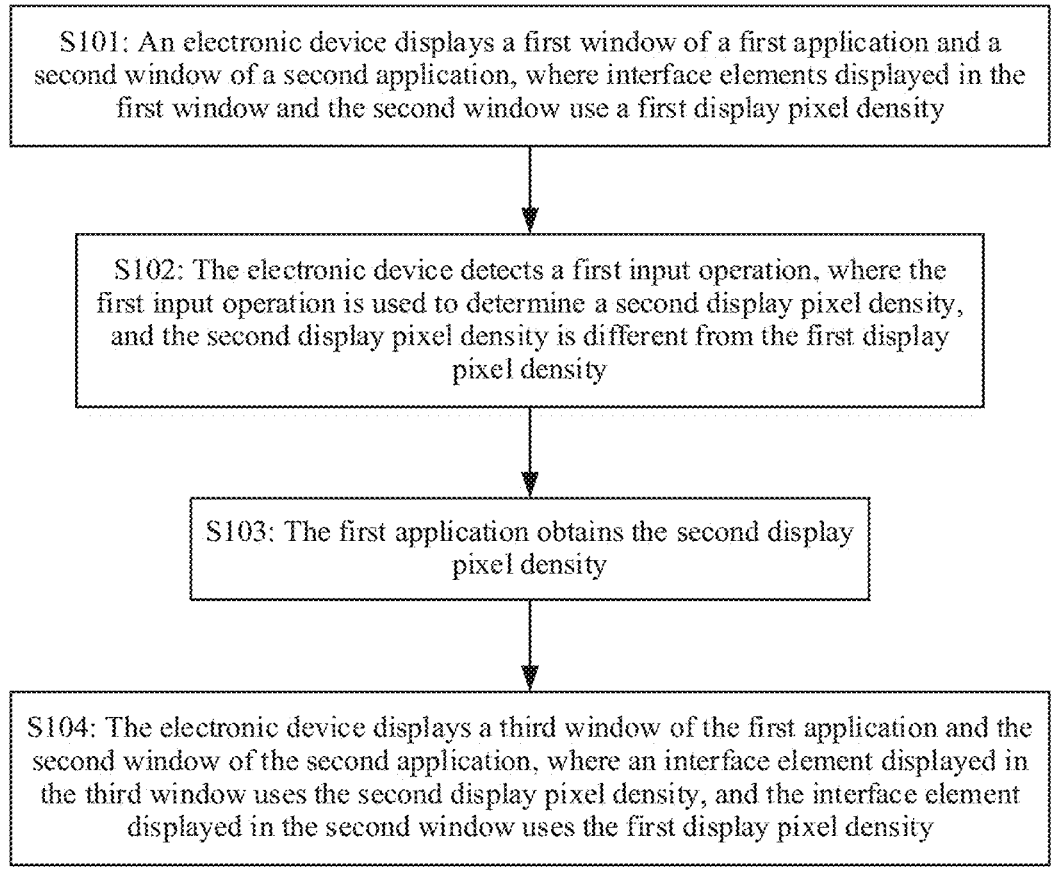
FIG. 7 is a flowchart of an interface display method according to an embodiment of this application.

FIG. 7 is a flowchart of an application interface display method according to an embodiment of this application. As shown in FIG. 7, the method may include the following steps.

S101: An electronic device may display a first window of a first application and a second window of a second application, where interface elements displayed in the first window and the second window use a first display pixel density.

The first display pixel density may also be referred to as a first pixel density. For this embodiment, refer to descriptions in related embodiments in FIG. 6a-1 and FIG. 6a-2 and FIG. 6b-1 and FIG. 6b-2. In a scenario in which the electronic device displays a plurality of windows, for example, the electronic device may display the first window of the first application and the second window of the second application, the first window is a current active window, the interface elements displayed in the first window and the second window may use the first display pixel density, and the first display pixel density may be a display pixel density used in a current system.

The first application may load a first application resource based on the obtained first display pixel density. An interface element in a display interface of the first application refers to the first application resource, and the first application resource is a resource file configured for the first display pixel density.

The application resource may include a picture, a string, a control, and the like. For most applications, a developer may provide different resources to perform adaptive display based. on different system display pixel densities. For example, for a same picture "image.png", three versions of hdpi, mdpi and ldpi may be provided, which all need to be stored with a same name in drawable directories. When an application is running, the system loads a corresponding resource based on a current system display pixel density of the electronic device.

The first application may have one or more sets of application resources, and the first application may load a corresponding application resource based on an obtained system display pixel density. Generally, the corresponding application resource is an application configuration file used by the first application to adapt to an optimal display effect based on the system display pixel density.

S102: The electronic device detects a first input operation, where the first input operation is used to determine a second display pixel density, and the second display pixel density is different from the first display pixel density.

The first input operation is also referred to as a first user operation. The first input operation may be a keyboard input event or a mouse input event, and may generate a corresponding gradation value. The first input operation may be an upscale operation or a downscale operation. For example, a scale control representing upscaling (+) or downscaling (−) in a user interface of the first application is clicked through a mouse, where clicking an upscale (+) control is the upscale operation, and clicking a downscale (−) control is the downscale operation. The scale control may be a floating control. The floating control floats over an entire user interface and is unnecessarily located in an application window. When the floating scale control is clicked, a current active window can respond to a corresponding instruction. The scale control may alternatively be a control embedded in an application window, and a display cycle of the control is bound to a life cycle of a window of a current application. For example, if the first application includes a plurality of sets of application resources, and an adaptation effect of jumping to and loading the application resource is relatively good, the scale control may be displayed in an application window of the first application, and the scale control may be clicked to control to scale an interface of the first application for display. If the first application does not have a plurality of sets of application resources or an adaptation effect of jumping to and loading the application resource is not good, the scale control may not be displayed in the application window of the first application, to avoid troubling a user. In this way, design of a user interface is more human centered.

In addition to clicking the scale control, the upscale operation/downscale operation may be implemented in the following manner: When a mouse pointer is located in the user interface of the first application, a "ctrl" key is pressed and a scroll wheel of a mouse is slid upward/downward, the "ctrl" key and a "▲"/"▼" key are simultaneously pressed, and so on. The upscale operation/downscale operation may be a touch event, for example, at a corresponding location in the user interface of the first application on a touchscreen or a touch panel, two fingers of a user open/gather the touchscreen in opposite directions to reach a first distance value, where the first distance value may be, for example, one centimeter. The upscale operation/downscale operation may be a gesture operation event, such as a special gesture for mid-air recognition. For details, refer to the embodiments shown in FIG. 3*a*-1 and FIG. 3*a*-2, FIG. 3*b*-1 and FIG. 3*b*-2, FIG. 4*a*-1 and FIG. 4*a*-2, FIG. 4*b*-1 and FIG. 4*b*-2, FIG. 5*a*-1 and FIG. 5*a*-2, FIG. 5*b*-1 and FIG. 5*b*-2, FIG. 6*a*-1 and FIG. 6*a*-2, and FIG. 6*b*-1 and FIG. 6*b*-2. The first input operation is used to determine the second display pixel density, and the second display pixel density may also be referred to as a second pixel density. The foregoing case is merely an example, and the first input operation is not limited in this embodiment of this application, provided that the objective described in this application can be achieved.

It should be noted that in this embodiment, the second display pixel density generated by the first input operation is a "cheat value", and is not a system display pixel density actually set in the current system. A display interface of the current system still uses the first display pixel density.

S103: The first application obtains the second display pixel density.

The first window of the first application may be a current active window, so that the first application obtains the second display pixel density in response to the first input operation.

It should be noted that in this embodiment, the second display pixel density obtained by the first application is not the first display pixel density actually used for interface display of the current system, but a "cheat" value provided to the first application to scale the user interface of the first application. If the first input operation is the upscale operation, the second display pixel density is less than the first display pixel density. If the first input operation is the downscale operation, the second display pixel density is greater than the first display pixel density.

Generally, a pixel density that can be used by an application is one of the following: 120 dpi, 160 dpi, 240 dpi, 320 dpi, 480 dpi, and 640 dpi.

In some embodiments, the application may reload an application resource by invoking updateConfiguration. Specifically, the application may obtain a Resource object and an AssetManager object through a getResources( ) function and a getAssets( ) function, and then invoke setConfiguration( ) to reload a second application resource.

Specifically, a DPI change of the application is mainly implemented at updateConfiguration in ResourcesImpl, and Configuration module refresh is triggered when a system configuration changes. Example program code is as follows:

```
String currentPackageName= android. app. Activity Thread.
currentPackageNwe( );
if (currentPackageName ! = null) {
  if (!mNoSupportMultiDPIWindow. containsKey(currentPackageName))
  {
    mConfiguration. densityDpi = MIDDIE_DPI;
    mMetrics. densityDpi = MIDDIE_DPI;
  }
}
```

Then the changed DPI, namely, densityDpi, of the application is updated into an mAsset function of a resource loading manager (AssetManager). Example program code is as follows:

```
mAssets.setConfiguration(mConfiguration.mcc, mConfiguration.mnc,
    adjustLanguageTag(mConfiguration.getLocales(
    ).get(0).toLanguageTag( )),
    mConfiguration.orientation,
    mConfiguration.touchscreen,
    mConfiguration.densityDpi, mConfiguration.keyboard,
    keyboardHidden, mConfiguration.navigation, width, height,
    mConfiguration.smallestScreenWidthDp,
    mConfiguration.screenWidthDp, mConfiguration.screenHeightDp,
    mConfiguration.screenLayout, mConfiguration.uiMode,
    mConfiguration.colorMode,
    Build.VERSION.RESOURCES_SDK_INT).
```

The resource loading manager may further deliver the application resource update event to a Resources resource module, and the application finally reads a corresponding application resource through the Resources resource module.

S104: The electronic device displays a third window of the first application and the second window of the second application, where an interface element displayed in the third window uses the second display pixel density, and the interface element displayed in the second window uses the first display pixel density.

In response to the first input operation, the first application updates an application configuration and loads the second application resource based on the obtained second display pixel density, and displays the third window of the first application. The interface element in a display-interface of the third window refers to the second application resource, and the second application resource is a resource file configured for the second display pixel density.

If the first input operation is the upscale operation, a size of the interface element displayed in the third window is larger than a size of the interface element displayed in the first window. If the first input operation is the downscale operation, the size of the interface element displayed in the third window is smaller than the size of the interface element displayed in the first window.

The second window of the second application is not a current active window, and therefore a size of the interface element displayed in the second window still uses the first display pixel density.

Embodiment 2

Figure 8:
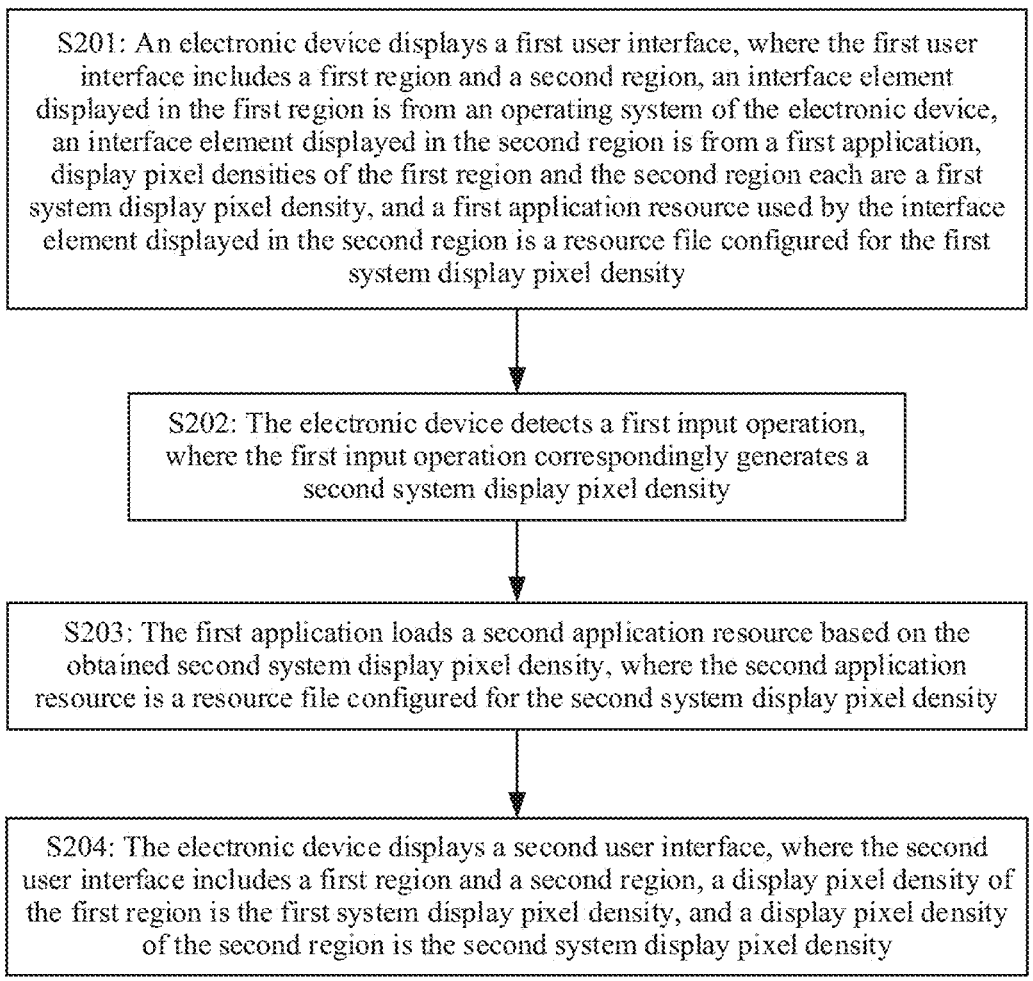
FIG. 8 is a flowchart of an interface display method according to an embodiment of this application.

FIG. 8 is a flowchart of an application interface display method according to another embodiment of this application. As shown in FIG. 8, the method may include the following steps.

S201: An electronic device displays a first user interface, where the first user interface includes a first region and a second region, an interface element displayed in the first region is from an operating system of the electronic device, an interface element displayed in the second region is from a first application, display pixel densities of the first region and the second region each are a first system display pixel density, and a first application resource used by the interface element displayed in the second region is a resource file configured for the first system display pixel density.

The first user interface may be a user interface displayed by a display of the electronic device. The first user interface may include the first region and the second region. The first region may be all or a part of a display interface of a desktop of the electronic device, and the second region is a display interface of the first application. For example, the interface element displayed in the first region includes any one or more of the following: a taskbar, a notification bar, an application icon, a quick start toolbar, a start button, a desktop background picture, a time bar, a network signal status indication icon, a power indication icon, or a sound indication icon.

The first system display pixel density in this embodiment may be a display pixel density used by the operating system of the electronic device, that is, a display pixel density used for actual display of an interface in the first region.

The first application loads the first application resource based on the obtained first system display pixel density. An interface element in a display interface of the first application refers to the first application resource, and the first application resource is a resource file configured for the first system display pixel density.

The application resource may include a picture, a string, a control, and the like. For most applications, a developer may provide different resources to perform adaptive display based on different system display pixel densities. For example, for a same picture "image.png", three versions of hdpi, mdpi and ldpi may be provided, which all need to be stored with a same name in drawable directories. When an application is running, the system loads a corresponding resource based on a current system display pixel density of the electronic device.

The first application may have one or more sets of application resources, and the first application may load a corresponding application resource based on an obtained current system display pixel density. Generally, the corresponding application resource is an application configuration file used by the first application to adapt to an optimal display effect based on the system display pixel density.

S202: The electronic device detects a first input operation, where the first input operation correspondingly generates a second system display pixel density.

The first input operation is also referred to as a first user operation. The first input operation may be a keyboard input event or a mouse input event, and may generate a corresponding gradation value. The first input operation may be an upscale operation or a downscale operation. For example, a control representing upscaling (+) or downscaling (−) in a user interface of the first application is clicked through a mouse, where clicking an upscale (+) control is the upscale operation, and clicking a downscale (−) control is the downscale operation. The upscale operation/downscale operation may be implemented in the following manner: When a mouse pointer is located in the user interface of the first application, a "ctrl" key is pressed and a scroll wheel of a mouse is slid upward/downward are simultaneously pressed, the "ctrl" key and a "▲"/"▼" key are simultaneously pressed, and so on. The upscale operation/downscale operation may be a touch event, for example, at a corresponding location in the user interface of the first application on a touchscreen or a touch panel, two fingers of a user open/gather the touchscreen in opposite directions to reach a first distance value, where the first distance value may be, for example, one centimeter. The upscale operation/downscale operation may be a gesture operation event, such as a special gesture for mid-air recognition. For details, refer to the embodiments shown in FIG. 3a-1 and FIG. 3a-2, FIG. 3b-1 and FIG. 3b-2, FIG. 4a-1 and FIG. 4a-2, FIG. 4b-1 and FIG. 4b-2, FIG. 5a-1 and FIG. 5a-2, and FIG. 5b-1 and FIG. 5b-2. The foregoing case is merely an example, and the first input operation is not limited in this embodiment of this application, provided that the objective described in this application can be achieved.

It should be noted that in this embodiment, the second system display pixel density generated by the first input operation is a "cheat value", and is not a system display pixel density actually set in the current system. A display interface of the current system still uses the first system display pixel density.

S203: The first application loads a second application resource based on the obtained second system display pixel density, where the second application resource is a resource file configured for the second system display pixel density.

It should be noted that in this embodiment, the second system display pixel density obtained by the first application is not the first system display pixel density actually used for interface display of the current system, but a "cheat" value provided to the first application to scale the user interface of the first application. If the first input operation is the upscale operation, the second system display pixel density is less than the first system display pixel density. If the first input operation is the downscale operation, the second system display pixel density is greater than the first system display pixel density.

For a code implementation example of how an application updates an application configuration and reloads a resource based on a system display pixel density, refer to the foregoing step S103. Details are not described again herein.

S204: The electronic device displays a second user interface, where the second user interface includes a first region and a second region, a display pixel density of the first region is the first system display pixel density, and a display pixel density of the second region is the second system display pixel density.

The second user interface may be a user interface displayed after the electronic device responds to the first input operation. The second user interface may include the first region and the second region. The first region may be all or a part of the display interface of the desktop of the electronic device, and the second region is the display interface of the first application.

A display pixel density used for actual display of an interface in the first region is still the first system display pixel density.

In response to the first input operation, the first application loads the second application resource based on the obtained second system display pixel density. The interface element in the display interface of the first application refers to the second application resource, and the second application resource is a resource file configured for the second system display pixel density. If the first input operation is the upscale operation, a size of the interface element displayed in the second region after the first input operation is larger than a size of the interface element displayed before the first input operation. If the first input operation is the downscale operation, the size of the interface element displayed in the second region after the first input operation is smaller than the size of the interface element displayed before the first input operation.

In some embodiments, some applications are not provided with a plurality sets of application resources. For example, an Android system desktop launcher (launcher) or some applications do not adapt well to the scaling function described in this application. For example, when loading an application resource, an application is severely stalled or easily crashed. In this case, applications may be classified, for example, an application "blacklist" for scaling display and an application "whitelist" for scaling display may be set. An application adapted well to the scaling function described in this application is put into the "whitelist" through classification, and the application in the "whitelist" can present the function of scaling an application interface described in the foregoing embodiment of this application. An application that does not have a plurality of sets of application resources or that does not adapt well to the scaling function described in this application is put into the "blacklist" through classification, and an application interface of the application in the "blacklist" does not respond to a user operation of scaling an application interface shown in the foregoing embodiment, and a scale control may not be displayed in a user interface to avoid misleading a user, so that scaling display of an interface of the application does not occur. For example, when it is detected that an application A is in the specified "blacklist", display of a scale control is canceled in a user interface of the application A; or when the first user operation of scaling corresponding to a mouse, a keyboard, a touch, or the like of a user is detected, the system does not report the input event to the application A, and the application A does not implement a scaling display effect. For example, if the Android system desktop launcher (launcher) and an application preconfigured in the system do not support a plurality of sets of DPI resources, the Android system desktop launcher and the application are put into the "blacklist" through classification. Example program code is as follows:

```
static HashMap<String, Integer>mNoSupportMultiDPIWindow =
new HashMap <>( );
static final int DEFAULT_MULTI_DPI = 2;
private static final int SMALLEST_DPI = 240;
private static final int MIDDLE_DPI = 320;
private static final int LARGE_DPIPI = 400;
static {
mNoSupportMultiDPIWindow. clear( );
    mNoSupportMultiDPIWindow. put ("com. huawei. android.
launcher", DEFAULT_MULTI_DPI);
    mNoSupportMultiDPIWindow. put ("com. Android. systemui",
DEFAULT_MULTI_DPI);
}
```

Specific classification may be adaptively adjusted by a developer based on a specific requirement. The classification method herein is merely an example for description, and is not limited in this application.

Through implementation of the embodiments of the method in this application, a user interface of an application can implement quick scaling display, to meet a requirement of a user for upscaling or downscaling displayed content in an application interface, thereby providing the user with a friendly operating environment, improving visual experience of the user, facilitating a development workload of a developer, and reducing development resources of an application.

In the foregoing specific implementations, the objectives, technical solutions, and beneficial effects of this application are further described in detail. It should be understood that the foregoing descriptions are merely specific implementations of this application, but are not intended to limit the protection scope of this application. Any modification, equivalent replacement, improvement, or the like made based on the technical solutions of this application shall fall within the protection scope of this application.

A person skilled in the art should understand that embodiments of this application may be provided as a method, a system, or a computer program product. Therefore, this application may use a form of a hardware-only embodiment, a software-only embodiment, or an embodiment with a combination of software and hardware. Moreover, the present invention may use a form of a computer program product that is implemented on one or more computer-usable storage media (including but not limited to a disk memory, an optical memory, and the like) that include computer-usable program code.

This application is described with reference to the flowcharts and/or block diagrams of the method, the device (system), and the computer program product according to embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may alternatively be loaded onto the computer or the another programmable data processing device, so that a series of operation steps are performed on the computer or the another programmable device to generate computer-implemented processing, and instructions executed on the computer or the another programmable device provide steps for implementing a function specified in one or more procedures in the flowchart and/or one or more blocks in the block diagram.

It is clearly that a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A method comprising:
    displaying a first window of a first application, a second window of a second application, and a scale control;
    displaying a first interface element in the first window and displaying a second interface element in the second window, wherein the first interface element and the second interface element have a first pixel density;
    detecting an input operation applied to the scale control, wherein the input operation indicates a second pixel density, and wherein the second pixel density is different from the first pixel density;
    displaying, while continuing to display the second window, a third window of the first application, wherein a third interface element displayed in the third window has the second pixel density;
    refreshing, using the first application, an application configuration; and
    loading, using the first application, an application resource based on the second pixel density, wherein the application resource is configured for the second pixel density.

2. The method of claim 1, wherein before displaying the third window, the method further comprises notifying the first application of the second pixel density.

3. The method of claim 1, wherein the scale control comprises an upscale control and a downscale control.

4. The method of claim 3, further comprising:
    identifying that the second pixel density is less than the first pixel density when the input operation is applied to the upscale control; and
    identifying that the second pixel density is greater than the first pixel density when the input operation is applied to the downscale control.

5. The method of claim 3, further comprising:
    identifying that a first size of the first interface element is larger than a second size of the third interface element when the input operation is applied to the upscale control; and
    identifying that the first size is smaller than the second size when the input operation is applied to the downscale control.

6. The method of claim 1, wherein the first application comprises a plurality of sets of application resources.

7. The method of claim 1, wherein the scale control is a floating control.

8. The method of claim 1, wherein the scale control is located in the first window.

9. An electronic device comprising:
    a memory configured to store instructions; and
    a processor coupled to the memory and configured to execute the instructions to cause the electronic device to:
        display a first window of a first application, a second window of a second application, and a scale control;
        display a first interface element in the first window and display a second interface element in the second window, wherein the first interface element and the second interface element have a first pixel density;
        detect an input operation applied to the scale control, wherein the input operation indicates a second pixel density, and wherein the second pixel density is different from the first pixel density;
        display a third window of the first application, while continuing to display the second window, wherein a third interface element displayed in the third window has the second pixel density;
        refresh, using the first application, an application configuration; and
        load, using the first application, an application resource based on the second pixel density, wherein the application resource is a resource file configured for the second pixel density.

10. The electronic device of claim 9, wherein before displaying the third window, the processor is further configured to execute the instructions to cause the electronic device to notify the first application of the second pixel density.

11. The electronic device of claim 9, wherein the scale control comprises an upscale control and a downscale control.

12. The electronic device of claim 11, wherein the processor is further configured to execute the instructions to cause the electronic device to:
    identify that the second pixel density is less than the first pixel density when the input operation is applied to the upscale control; and
    identify that the second pixel density is greater than the first pixel density when the input operation is applied to the downscale control.

13. The electronic device of claim 11, wherein the processor is further configured to execute the instructions to cause the electronic device to:
    identify that a first size of the first interface element is larger than a second size of the third interface element when the input operation is applied to the upscale control; and identify that the first size is smaller than the second size when the input operation is applied to the downscale control.

14. The electronic device of claim 9, wherein a pixel density used by the first application is one of 120 dots per inch (dpi), 160 dpi, 240 dpi, 320 dpi, 480 dpi, or 640 dpi.

15. The electronic device of claim 9, wherein the processor is further configured to execute the instructions to cause the electronic device to identify that the first application comprises a plurality of sets of application resources before responding to the input operation.

16. The electronic device of claim 9, wherein the scale control is a floating control.

17. The electronic device of claim 9, wherein the scale control is located in the first window.

18. A computer program product comprising computer-executable instructions that are stored on a non-transitory computer-readable storage medium and that, when executed by a processor, cause an electronic device to:
display a first window of a first application, a second window of a second application, and a scale control;
display a first interface element in the first window and a second interface element in the second window, wherein the first interface and the second interface element have a first pixel density;
detect an input operation applied to the scale control, wherein the input operation indicates a second pixel density, and wherein the second pixel density is different from the first pixel density;
display a third window of the first application while continuing to display the second window, wherein a third interface element displayed in the third window has the second pixel density;
refresh, using the first application, an application configuration; and
load, using the first application, an application resource based on the second pixel density, wherein the application resource is a resource file configured for the second pixel density.

19. The computer program product of claim 18, wherein before displaying the third window, the processor is further configured to execute the instructions to cause the electronic device to notify the first application of the second pixel density.

20. The computer program product of claim 18, wherein the scale control comprises an upscale control and a downscale control.

* * * * *